US011030463B2

(12) United States Patent
Miyake et al.

(10) Patent No.: US 11,030,463 B2
(45) Date of Patent: Jun. 8, 2021

(54) SYSTEMS AND METHODS FOR DISPLAYING CAPTURED VIDEOS OF PERSONS SIMILAR TO A SEARCH TARGET PERSON

(71) Applicant: PANASONIC I-PRO SENSING SOLUTIONS CO., LTD., Fukuoka (JP)

(72) Inventors: Yuumi Miyake, Fukuoka (JP); Takamitsu Arai, Fukuoka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 16/268,052

(22) Filed: Feb. 5, 2019

(65) Prior Publication Data

US 2020/0097734 A1 Mar. 26, 2020

(30) Foreign Application Priority Data

Sep. 20, 2018 (JP) .............................. JP2018-176489

(51) Int. Cl.
*H04N 7/18* (2006.01)
*G06K 9/00* (2006.01)
(Continued)

(52) U.S. Cl.
CPC ..... *G06K 9/00771* (2013.01); *G06K 9/00979* (2013.01); *G06K 9/2081* (2013.01);
(Continued)

(58) Field of Classification Search
CPC ... G01S 3/00; G06F 3/04883; G06K 9/00288; H04N 5/232; H04N 5/23219; H04N 5/247; H04N 7/18; H04N 7/181
See application file for complete search history.

(56) References Cited

U.S. PATENT DOCUMENTS

2008/0263592 A1* 10/2008 Kimber ................. G06F 3/0486
725/38
2009/0324020 A1* 12/2009 Hasebe ..................... G06T 7/00
382/115
(Continued)

FOREIGN PATENT DOCUMENTS

JP       2001-268657       9/2001
JP       2014-153813       8/2014
(Continued)

*Primary Examiner* — Jessica M Prince
(74) *Attorney, Agent, or Firm* — Greenblum & Bernstein, P.L.C.

(57) ABSTRACT

When captured videos transmitted from a n number of cameras are received, a server analyzes position information and characteristic information on a person appearing in each of captured videos as analysis results. A client terminal displays, on a screen, each of the captured videos of a k number of cameras that are selected by a user operation. According to a selection of a search target person, the client terminal transmits, to the server, a search request for the search target person in a (k−1) number of captured videos other than the captured video in which the search target person appears. The server extracts the search target person and transmits the analysis result to the client terminal. The (Continued)

client terminal displays cut-out images of one or more persons identical with or similar to the search target person based on the analysis result.

14 Claims, 18 Drawing Sheets

(51) Int. Cl.
  *H04N 5/445* (2011.01)
  *G06K 9/32* (2006.01)
  *G06K 9/20* (2006.01)
  *H04N 21/47* (2011.01)
  *H04N 21/431* (2011.01)
  *H04L 29/06* (2006.01)
  *H04L 29/08* (2006.01)

(52) U.S. Cl.
  CPC ............... *G06K 9/32* (2013.01); *H04N 5/445* (2013.01); *H04N 7/181* (2013.01); *H04N 21/4316* (2013.01); *H04N 21/47* (2013.01); *H04L 65/601* (2013.01); *H04L 67/10* (2013.01); *H04L 67/42* (2013.01)

(56) References Cited

U.S. PATENT DOCUMENTS

| | | | |
|---|---|---|---|
| 2015/0356840 A1* | 12/2015 | Wang | G08B 13/19682 382/103 |
| 2016/0203367 A1* | 7/2016 | Oami | G06T 7/0002 382/103 |
| 2017/0352380 A1* | 12/2017 | Doumbouya | G06T 7/292 |
| 2018/0103241 A1* | 4/2018 | Waniguchi | G08B 13/19693 |
| 2018/0139416 A1* | 5/2018 | Hirasawa | H04N 5/144 |
| 2019/0019016 A1* | 1/2019 | Ikeda | H04N 5/247 |
| 2019/0080003 A1* | 3/2019 | Alcantara | G06F 16/784 |
| 2020/0065324 A1* | 2/2020 | Watanabe | G06F 16/532 |

FOREIGN PATENT DOCUMENTS

| | | |
|---|---|---|
| JP | 2017-040983 | 2/2017 |
| JP | 2018-093423 | 6/2018 |
| WO | 2012/157611 | 11/2012 |
| WO | 2014/065033 | 5/2014 |
| WO | 2018/163398 | 9/2018 |

* cited by examiner

SYSTEMS AND METHODS FOR DISPLAYING CAPTURED VIDEOS OF PERSONS SIMILAR TO A SEARCH TARGET PERSON

BACKGROUND OF THE INVENTION

1. Field of the Invention

The present disclosure relates to a person search system and a person search method in which a person appearing in the field of view of a camera is searched for using a video captured by the camera.

2. Background Art

JP-A-2017-40983 discloses a security system in which, when a predetermined event is detected in a monitoring area, a captured image of a suspect is extracted from captured images recorded by a recorder, a transitional captured image based on a behavior of the suspect is displayed, and map information indicating the captured position of the captured image is displayed. In the security system, when a captured image as a position display target is selected in the transitional captured image, positional information of the captured point of the corresponding captured image is displayed on the map information. As a result, trace information related to the behavior of a monitoring target such as a person in the monitoring area is visually obtained.

However, JP-A-2017-40983 does not consider a technique of identifying a camera-captured image of a person who is visually similar to a person (that is, a criminal) causing an incident or an accident (hereinafter, referred to as "incident or the like") occurred at a point (for example, an intersection) where many persons come and go and searching for a similar captured image from a captured video of another camera based on the identified captured image as a clue.

When an incident or the like occurs, it is important to promptly grasp visual characteristics and whereabouts of a criminal in the initial investigation by police. In the related art, clues such as captured videos of cameras installed at intersections or eyewitness reports are collected, and a police officer grasps characteristics or an escaping direction of a person who is likely to correspond to a criminal based on the captured videos or the eyewitness reports. Therefore, a long time is required for the police officer to grasp the characteristics or the escaping direction of the criminal, and the initial investigation may be delayed. As a result, there is a problem in that the technique of the related art is not efficient.

SUMMARY OF THE INVENTION

The present disclosure has been made in consideration of the above-described circumstances of the related art, and an object thereof is to provide a person search system and a person search method in which, when an incident or the like occurs at a point where many persons come and go, a captured image of a person who is visually similar to a criminal is extracted with high accuracy, a prompt grasp of visual characteristics or the like of the criminal is efficiently supported, and the convenience of a police investigation is accurately improved.

The present disclosure provides a person search system including a server connected to communicate with each of an n number of cameras, where n is an integer of 3 or greater, and a client terminal connected to communicate with the server, wherein the server receives captured videos transmitted from the n number of cameras, analyzes position information and characteristic information on a person appearing in each of the captured videos and accumulates the position information and the characteristic information as analysis results, the client terminal displays, on a screen, each of the captured videos of a k number of cameras, where k is an integer of 2 or greater that satisfies k≤n that are selected from then number of cameras by a user operation, according to a selection of a search target person appearing in any one of the k number of captured videos, the client terminal transmits, to the server, a search request for the search target person in a (k−1) number of captured videos other than the captured video in which the search target person appears, the server uses the analysis results to extract an analysis result regarding the search target person in the (k−1) number of captured videos and transmits the analysis result to the client terminal in response to the search request, and the client terminal aligns and displays cut-out images of one or more persons identical with or similar to the search target person based on the analysis result regarding the search target person.

The present disclosure also provides a person search method implemented by a server connected to communicate with each of an n number of cameras, where n is an integer of 3 or greater and a client terminal connected to communicate with the server, the method including receiving captured videos transmitted from the n number of cameras, analyzing position information and characteristic information on a person appearing in each of the captured videos and accumulates the position information and the characteristic information as analysis results, displaying, on a screen, each of the captured videos of a k number of cameras, where k is an integer of 2 or greater that satisfies k≤n that are selected from the n number of cameras by a user operation, according to a selection of a search target person appearing in any one of the k number of captured videos, transmitting, to the server, a search request for the search target person in a (k−1) number of captured videos other than the captured video in which the search target person appears, using the analysis results to extract an analysis result regarding the search target person in the (k−1) number of captured videos and transmitting the analysis result to the client terminal in response to the search request, and aligning and displaying cut-out images of one or more persons identical with or similar to the search target person based on the analysis result regarding the search target person.

The present disclosure also provides a person search system including a server connected to communicate with each of an n number of cameras, where n is an integer of 3 or greater, and a client terminal connected to communicate with the server, wherein the server receives captured videos transmitted from the n number of cameras, analyzes position information and characteristic information on a person appearing in each of the captured videos and accumulates the position information and the characteristic information as analysis results, the client terminal displays, on a screen, each of the captured videos of a k number of cameras, where k is an integer of 2 or greater that satisfies k≤n that are selected from the n number of cameras by a user operation, according to a selection of characteristic information regarding an appearance of a search target person, the client terminal transmits, to the server, a search request for the search target person satisfying the characteristic information in the k number of captured videos, the server uses the analysis results to extract an analysis result regarding the search target person satisfying the characteristic information in the k number of captured videos and transmits the analysis result to the client terminal in response to the search request, and the client terminal aligns and displays cut-out images of one or more persons identical with or similar to the search target person based on the analysis result regarding the search target person.

The present disclosure also provides a person search method implemented by a server connected to communicate with each of an n number of cameras, where n is an integer of 3 or greater and a client terminal connected to communicate with the server, the method including receiving captured videos transmitted from the n number of cameras, analyzing position information and characteristic information on a person appearing in each of the captured videos and accumulates the position information and the characteristic information as analysis results, displaying, on a screen, each of captured videos of a k number of cameras, where k is an integer of 2 or greater that satisfies k≤n that are selected from then number of cameras by a user operation, according to a selection of characteristic information regarding an appearance of a search target person, transmitting a search request for the search target person satisfying the characteristic information in the k number of captured videos, using the analysis results to extract an analysis result regarding the search target person satisfying the characteristic information in the k number of captured videos and transmitting the analysis result to the client terminal in response to the search request; and aligning and displaying cut-out images of one or more persons identical with or similar to the search target person based on the analysis result regarding the search target person.

The present disclosure also provides a person search system including a server connected to communicate with each of an n number of cameras, where n is an integer of 3 or greater, and a client terminal connected to communicate with the server, wherein the server receives captured videos transmitted from the n number of cameras, analyzes position information and characteristic information on a person appearing in each of the captured videos and accumulates the position information and the characteristic information as analysis results, the client terminal displays, on a screen, each of the captured videos of a k number of cameras, where k is an integer of 2 or greater that satisfies k≤n that are selected from the n number of cameras by a user operation, according to a selection of a companion who goes together with a search target person appearing in any one of the k number of captured videos, the client terminal transmits, to the server, a search request for the companion in a (k−1) number of captured videos other than the captured video in which the companion appears, the server uses the analysis results to extract an analysis result regarding the companion in the (k−1) number of captured videos and transmits the analysis result to the client terminal in response to the search request, and the client terminal aligns and displays cut-out images of one or more persons identical with or similar to the companion based on the analysis result regarding the companion.

The present disclosure also provides a person search method implemented by a server connected to communicate with each of an n number of cameras, where n is an integer of 3 or greater and a client terminal connected to communicate with the server, the method including receiving captured videos transmitted from the n number of cameras, analyzing position information and characteristic information on persons appearing in each of the captured videos and accumulates the position information and the characteristic information as analysis results, displaying, on a screen, each of captured videos of a k number of cameras, where k is an integer of 2 or greater that satisfies k≤n that are selected from then number of cameras by a user operation, according to a selection of a companion who acts together with a search target person appearing in any one of the k number of captured videos, transmitting, to the server, a search request for the companion in a (k−1) number of captured videos other than the captured video in which the companion appears, using the analysis results to extract an analysis result regarding the companion in the (k−1) number of captured videos and transmitting the analysis result to the client terminal in response to the search request, and aligning and displaying cut-out images of one or more persons identical with or similar to the companion based on the analysis result regarding the companion.

According to the present disclosure, when an incident or the like occurs at a point where many persons come and go, a captured image of a person that is visually similar to a criminal can be extracted with high accuracy, and a prompt grasp of visual characteristics and an escaping direction of the criminal is efficiently supported. Therefore, the convenience of a police investigation can be accurately improved.

BRIEF DESCRIPTION OF THE DRAWINGS

FIG. 7 is a diagram illustrating an example of a setting screen for characteristic information of a search target person to be searched for;

Figure 1:
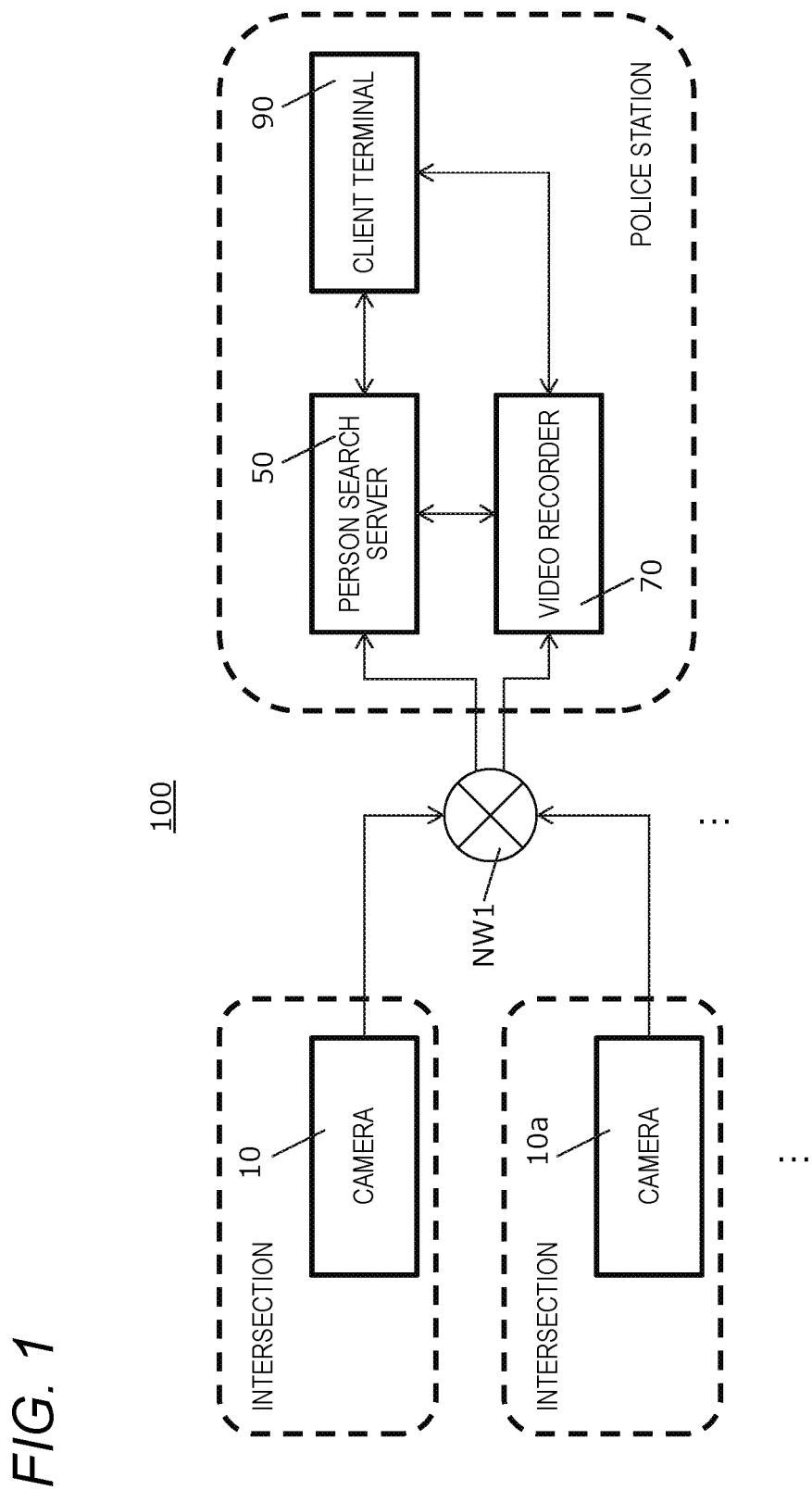
FIG. 1 is a block diagram illustrating a system configuration example of a person search system.

DESCRIPTION OF THE EXEMPLARY EMBODIMENT (Details Leading to a Content of First Embodiment)

JP-A-2017-40983 does not consider a technique of searching for captured videos of a plurality of cameras based on characteristic information regarding the appearance such as a decoration of a person (that is, a criminal) who commits an incident or the like occurred in a place (for example, an intersection) where many persons come and go and visually presenting a cut-out image of a person that satisfies the characteristic information.

When an incident or the like occurs, it is important to promptly grasp characteristics regarding the appearance and whereabouts of a criminal in the initial investigation by police. In the related art, clues such as captured videos of cameras installed at intersections or eyewitness reports are collected, and a police officer grasps appearance characteristics or an escaping direction of a person who is likely to correspond to a criminal based on the captured videos or the eyewitness reports. Therefore, a long time is required for the police officer to grasp the appearance characteristic or the escaping direction of the criminal, and the initial investigation may be delayed. As a result, there is a problem in that the technique of the related art is not efficient.

In the following first embodiment, an example of a person search system and a person search method will be described in which, when an incident or the like occurs at a point where many persons come and go, a captured image of a person who is visually similar to a criminal is extracted from captured videos of a plurality of cameras based on characteristic information regarding the appearance such as a decoration of the criminal, a prompt grasp of visual characteristics and an escaping direction of the criminal is efficiently supported, and the convenience of a police investigation is accurately improved.

First Embodiment

Hereinafter, an embodiment that specifically discloses a person search system and a person search method according to the present disclosure will be described in detail appropriately with reference to the accompanying drawings. However, descriptions detailed more than necessary may be omitted. For example, already well-known matters may not be described in detail, and the description of substantially the same configuration may not be repeated. The reason for this is to prevent the following description from being unnecessarily redundant for easy understanding of those skilled in the art. It is noted that the accompanying drawings and the following descriptions are provided for those skilled in the art to fully understand the present disclosure and the subject matter described in the claims is not limited thereto.

Hereinafter, an example in which a person search system supports a police investigation for searching for a person such as a criminal who commits an incident or the like (for example, an incident or an accident) at a point (for example, an intersection or the vicinity thereof) where many persons come and go.

FIG. 1 is a block diagram illustrating a system configuration example of a person search system 100. The person search system 100 includes an n (n: an integer of 3 or greater) number of cameras 10, 10a, and . . . , a person search server 50, a video recorder 70, and a client terminal 90. As illustrated in FIG. 1, each of the cameras 10, 10a, and . . . is installed outdoors (for example, a point such as an intersection where many persons come and go). However, each of the cameras 10, 10a, and . . . is not necessarily installed at outdoors. For example, the person search server 50, the video recorder 70, and the client terminal 90 are installed in a predetermined room of a police station. However, the person search server 50, the video recorder 70, and the client terminal 90 are not necessarily installed in a police station. In the following descriptions, the video recorder 70 may be provided as an online storage connected to the person search server 50 through a communication line such as the Internet, instead of on-premises management in a police station.

In the person search system 100, one camera (for example, the camera 10) is installed at one intersection. A plurality of cameras (for example, the camera 10 or an existing camera having an internal configuration different from that of the camera 10) may be installed at one intersection. Accordingly, the camera 10 is installed at one intersection, and the camera 10a is installed at another intersection. The internal configurations of the cameras 10, 10a, and . . . are the same as each other. The cameras 10, 10a, and . . . are communicatively connected to each of the person search server 50 and the video recorder 70 through a network NW1 such as a communication line of an intranet or the Internet. The network NW1 is configured by a wired communication line (for example, an optical communication network using an optical fiber) but may be configured by a wireless communication network.

Each of the cameras 10, 10a, and . . . is a monitoring camera that can capture a subject (for example, a video indicating the state of an intersection) at an angle of view that is set when the camera is installed at an intersection, and repeatedly transmits captured video data to each of the person search server 50 and the video recorder 70. The meaning of the captured video data includes not only the captured video data but also identification information of a camera that captures the captured video (in other words, positional information of an intersection at which the corresponding camera is installed) and information of a capturing time and date.

Figure 3:
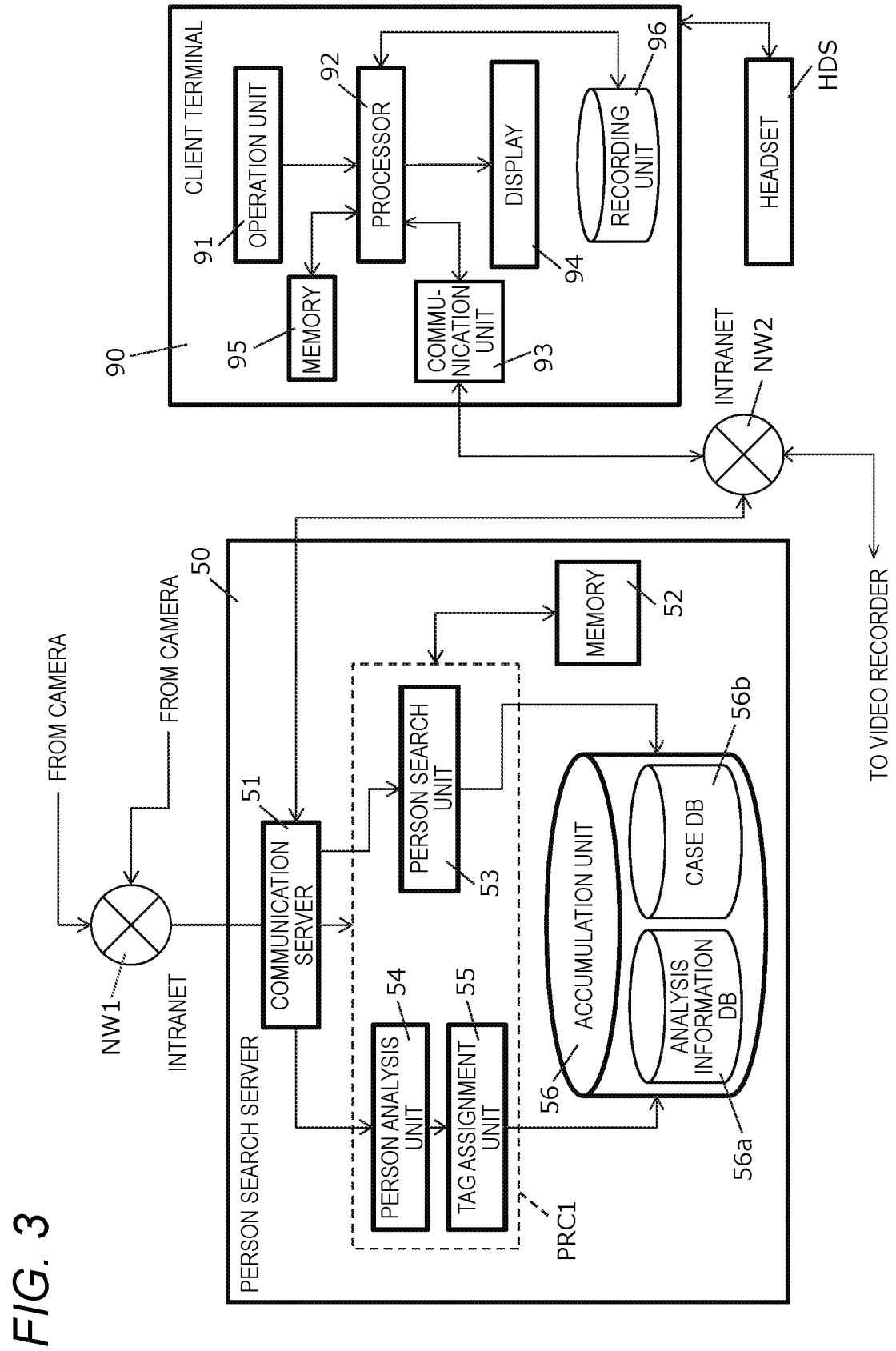
FIG. 3 is a block diagram illustrating an internal configuration example of each of a person search server and a client terminal.

The person search server 50 (one aspect of the server) is installed in, for example, a police station, receives captured video data transmitted from the respective cameras 10, 10a, and . . . installed at all or some of the intersections in a jurisdiction area of the police station, and temporarily stores the captured video data in a memory 52 or an accumulation unit 56 (refer to FIG. 3) for various processes to be executed by a processor PRC1 (refer to FIG. 3).

Whenever the stored captured video data is transmitted from each the cameras 10, 10a, and . . . and is received by the person search server 50, positional information and characteristic information of a person appearing in the captured video are analyzed by the person search server 50. This analysis result is stored in the accumulation unit 56 of the person search server 50 to be used for searching for a criminal who commits an incident or the like to occur. Specifically, the person search server 50 acquires tag information (for example, characteristic information such as face, sex, age, height, body shape, or decoration of the person appearing in the captured video) regarding the content of the captured video as the analysis result, and the tag information may be accumulated in the accumulation unit 56 by associating the tag information with the captured video data. For example, when an event such as an incident occurs, when a user operation of inputting characteristic information (refer to FIG. 7) regarding the visual appearance regarding a person image of a criminal (one aspect of the search target person) is received, the client terminal 90 generates a search request for a person image of the criminal satisfying the characteristic information and transmits the generated search request to the person search server 50. The person search server 50 searches for the person that satisfies characteristic information included in the search request using the analysis results of the captured videos of the respective cameras described above.

The person search server 50 may transmit some captured videos (for example, captured videos (for example, captured videos of an important incident or a serious incident) selected by an operation of a terminal (not illustrated) used by a manager in a police station) to the video recorder 70 to accumulate the captured videos therein.

The client terminal 90 is installed in, for example, a police station, is used by staff in the police station (that is, a police officer as a user in the police station), and is, for example, a laptop or notebook PC (Personal Computer). For example, when an incident or the like occurs, a user acquires various information regarding the incident or the like from an informer who informs the police station of the occurrence of the incident or the like through a telephone and operates the client terminal 90 to record the various information as an eyewitness report. The client terminal 90 is not limited to the above-described type PC and may be, for example, a computer having a communication function such as a smartphone, a tablet terminal, or a Personal Digital Assistant (PDA). The client terminal 90 transmits a search request to the person search server 50 in order to make the person search server 50 search for a search target person (that is, a criminal causing the incident or the like) who is consistent with the eyewitness report, and displays search results thereof on a display 94.

The video recorder 70 is installed in, for example, a police station, receives captured video data transmitted from the respective cameras 10, 10a, and . . . installed at all or some of intersections in a jurisdiction area of the police station, and stores the captured video data for backup or the like. The video recorder 70 may transmit the stored captured video data of the cameras to the client terminal 90 in response to a request from the client terminal 90 corresponding to a user operation. The person search server 50, the video recorder 70, and the client terminal 90 are communicatively connected to each other through a network NW2 such as an intranet in the police station or the Internet.

In FIG. 1, the number of each of the person search server 50, the video recorder 70, and the client terminal 90 installed in the police station is one but may be plural. In addition, the person search system 100 may be provided for a plurality of police stations. In addition, in the person search system 100 illustrated in FIG. 1, respective configurations of the person search server 50 and the client terminal 90 may be configured by the same computer device (for example, a desktop or laptop personal computer). That is, a computer device having respective functions of the person search server 50 and the client terminal 90 may be provided instead of the person search server 50 and the client terminal 90.

Figure 2:
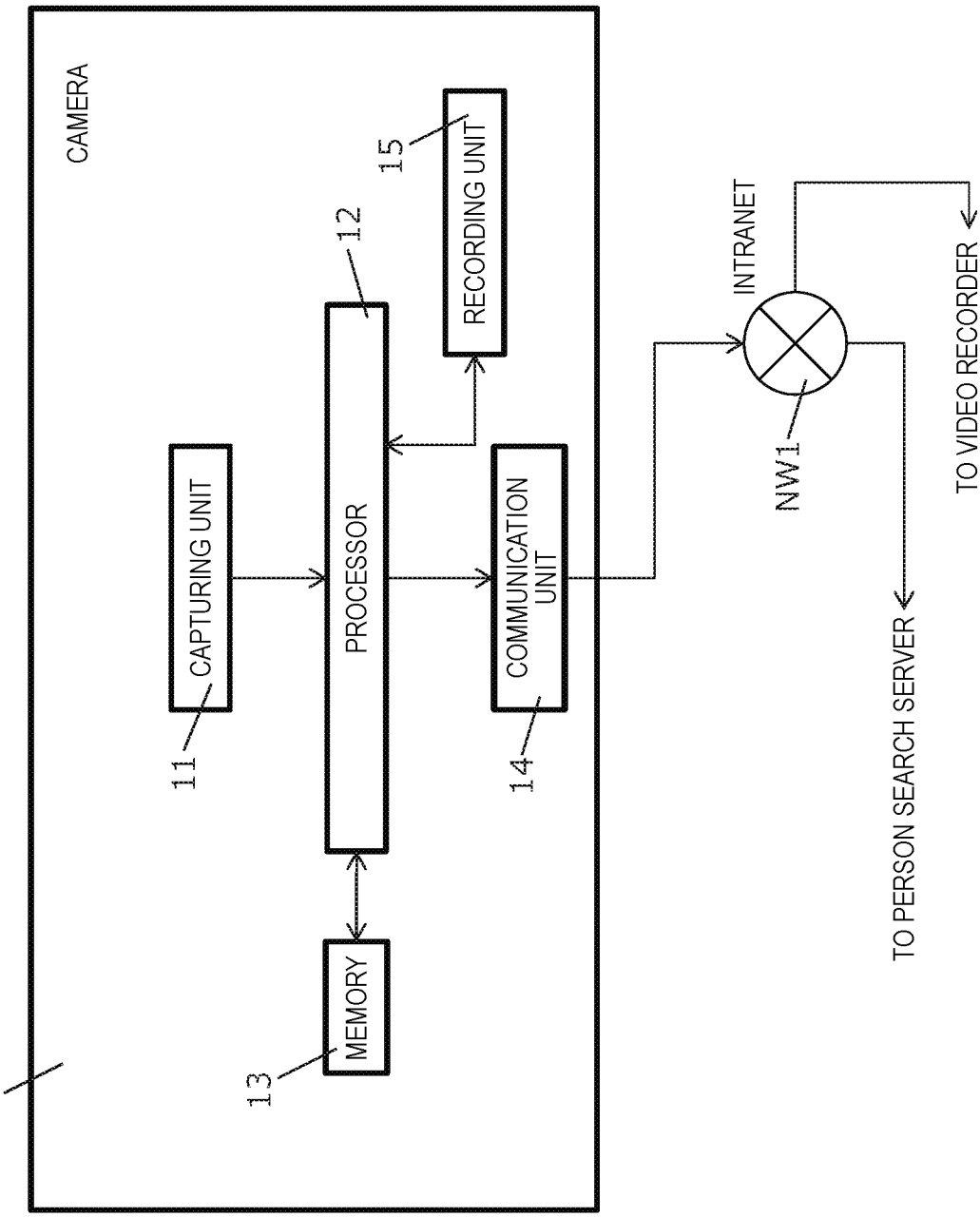
FIG. 2 is a block diagram illustrating an internal configuration example of a camera.

FIG. 2 is a block diagram illustrating an internal configuration example of the cameras 10, 10a, and. . . . As described above, the cameras 10, 10a, and . . . have the same configuration. Hereinafter, the camera 10 will be described as an example. As illustrated in FIG. 2, the camera 10 includes a capturing unit 11, a processor 12, a memory 13, a communication unit 14, and a recording unit 15. In addition, the camera 10 may include a plurality of capturing units and may be, for example, a multi-sensor camera having an angle of view in two directions. In this configuration, a first capturing unit (for example, the capturing unit 11) captures a wide range of an intersection to capture the entire area of the intersection, and a second capturing unit captures a region (a region where a pedestrian positioned below in a direction perpendicular to an installation position of the camera 10 walks) that is a blind spot at an angle of view of the first capturing unit. Even when a plurality of capturing units are provided, respective internal configurations of the capturing units are the same. Therefore, the capturing unit 11 will be described as an example.

The capturing unit 11 includes a lens for collecting light and a solid-state image sensor such as a Charge Coupled Device (CCD) image sensor or a Complementary Metal Oxide Semiconductor (CMOS) image sensor. While a power supply of the camera 10 is turned on, the capturing unit 11 outputs captured video data of a subject, which is obtained by the solid-state image sensor capturing the subject, to the processor 12 at all times. In addition, the capturing unit 11 may include a mechanism that changes a zoom magnification at each capturing moment.

The processor 12 is configured using, for example, a Central Processing Unit (CPU), a Digital Signal Processor (DSP), or a Field-Programmable Gate Array (FPGA). The processor 12 functions as a controller of the camera 10 and executes a control process for integrating operations of the respective units of the camera 10, a process of inputting and outputting data between the respective units of the camera 10, a data arithmetic operation (computation) process, and a data storage process. The processor 12 operates according to a program and data stored in the memory 13. The processor 12 acquires current time information using the memory 13 during an operation, or executes various well-known image processing on captured video data obtained by the capturing unit 11 and then records the processed captured video data in the recording unit 15. When the camera 10 includes a Global Positional System (GPS) receiver although the GPS receiver is not illustrated in FIG. 2, the camera 10 may acquire current positional information from the GPS receiver and may record the positional information in association with the captured video data.

Here, the GPS receiver will be simply described. The GPS receiver receives a satellite signal including a signal transmission time and position coordinates transmitted from each of a plurality of GPS transmitters (for example, four navigation satellites). Using the plurality of satellite signals, the GPS receiver calculates current position coordinates of the camera and the reception time of the satellite signals. This calculation may be executed by the processor 12 that inputs an output from the GPS receiver, instead of the GPS receiver. The information of the reception time may be used for correcting the system time of the camera. The system time may be used, for example, for recording the capturing time of a captured image constituting a captured video.

In addition, the processor 12 may variably control a capturing condition (for example, a zoom magnification) of the capturing unit 11 according to a control command received from an external device through the communication unit 14. For example, if the control command received from the external device is an instruction of changing a zoom magnification, the processor 12 changes a zoom magnification according to the control command during the capturing of a capturing unit selected by the control command.

In addition, the processor 12 repeatedly transmits the captured video data recorded in the recording unit 15 to each of the person search server 50 and the video recorder 70 through the communication unit 14. Here, the meaning of "repeatedly transmit" is not limited to transmitting data at a time interval of a predetermined regular period and includes transmitting data at predetermined irregular intervals instead of a regular period and transmitting data multiple times.

The memory 13 is configured using, for example, a Random Access Memory (RAM) and a Read Only Memory (ROM) and temporarily stores a program and data required for executing the operation of the camera 10, information or data generated during the operation, and the like. The RAM is, for example, a work memory used during the operation of the processor 12. The ROM stores, for example, a program and data for controlling the processor 12 in advance. In addition, the memory 13 stores, for example, identification information (for example, a serial number) for identifying the camera 10 and various setting information.

The communication unit 14 transmits the captured video data recorded in the recording unit 15 to each of the person search server 50 and the video recorder 70 through the network NW1 based on an instruction of the processor 12. In addition, the communication unit 14 receives a control command of the camera 10 that is transmitted from an external device (for example, the person search server 50) or transmits state information of the camera 10 to an external device (for example, the person search server 50).

The recording unit 15 is configured using an external storage medium such as a semiconductor memory (for example, a flash memory) built into the camera 10 or a memory card (for example, an SD card) built into the camera 10. The recording unit 15 records the captured video data generated by the processor 12 in association with the identification information of the camera 10 and the information of the capturing time and date. The recording unit 15 always pre-buffers and stores captured video data for a predetermined period of time (for example, 30 seconds) and continuously accumulates the captured video data while overwriting captured video data ranging up to a predetermined period of time (for example, 30 seconds) before the current time. When the recording unit 15 is configured using a memory card, the recording unit 15 is mounted to be removable from the case of the camera 10.

FIG. 3 is a block diagram illustrating an internal configuration example of each of the person search server 50 and the client terminal 90. The person search server 50, the client terminal 90, and the video recorder 70 are connected to each other through an intranet such as a wired LAN (Local Area Network) provided in a police station but may be connected to each other through a wireless network such as a wireless LAN.

The person search server 50 includes a communication unit 51, a memory 52, a person search unit 53, a person analysis unit 54, a tag assignment unit 55, and an accumulation unit 56. The person search unit 53, the person analysis unit 54 and the tag assignment unit 55 are configured using the processor PRC1 such as a CPU, a DSP, or an FPGA.

The communication unit 51 communicates with the cameras 10, 10a, and . . . connected through the network NW1 such as an intranet to receive data of a captured video (that is, a video indicating the state of persons who come and go at an intersection) transmitted from each of the cameras 10, 10a, and. . . . In addition, the communication unit 51 communicates with the client terminal 90 through the network NW2 such as an intranet provided in a police station to receive a search request for the search target person transmitted from the client terminal 90 or to transmit a response of the search request. In addition, the communication unit 51 transmits the captured video data stored in the memory 52 or the accumulation unit 56 to the video recorder 70.

The memory 52 is configured using, for example, a RAM and a ROM and temporarily stores a program and data required for executing the operation of the person search server 50, information or data generated during the operation, and the like. The RAM is, for example, a work memory used during the operation of the processor PRC1. The ROM stores, for example, a program and data for controlling the processor PRC1 in advance. In addition, the memory 52 stores, for example, identification information (for example, a serial number) for identifying the person search server 50 and various setting information.

The person search unit 53 searches for a captured image in which a person satisfying the characteristic information (one aspect of the search condition) included in the search request appears in the data recorded in the accumulation unit 56 based on the search request for the search target person transmitted from the client terminal 90. The person search unit 53 extracts search results and transmits the extracted data of the search results to the client terminal 90 through the communication unit 51.

For example, whenever the captured video data transmitted from each of the cameras 10, 10a, and . . . is stored in the accumulation unit 56, the person analysis unit 54 analyzes the stored captured video data. The person analysis unit 54 analyzes and acquires information regarding a person appearing in the captured video (in other words, a person present at an intersection where the camera is installed or in the vicinity thereof). The person analysis unit 54 generates a cut-out image in which the face of the person appears as an example of information regarding the person, further acquires characteristic information such as sex, age, height, body shape and decoration, positional information indicating whereabouts of the person, and a moving direction when the person passes through the intersection (specifically, a direction in which the person moves into the intersection and a direction in which the person moves out from the intersection) as information regarding the person, and transmits the information regarding the person to the tag assignment unit 55. The person analysis unit 54 can determine the moving direction when the person passes through the intersection based on, for example, a time difference between frames of a plurality of captured images. The moving direction indicates, for example, a direction in which the person moves and passes through a pedestrian crosswalk provided at the intersection.

The tag assignment unit 55 records the information regarding the person that is obtained by the person analysis unit 54 and the capturing time and date and the point (that is, the position of the intersection) of the captured video that is used for the analysis by the person analysis unit 54 in an analysis information database (DB) 56a of the accumulation unit 56 in association with each other (one aspect of tag assignment). As a result, the person search server 50 clearly determine person information that is assigned to a captured video that is captured at a certain intersection at a certain time. The process of the tag assignment unit 55 may be executed by the person analysis unit 54. In this case, it is not necessary to configure the tag assignment unit 55.

The accumulation unit 56 is configured using, for example, a hard disk drive (HDD) or a solid-state drive (SSD). The accumulation unit 56 records the captured video data transmitted from each of the cameras 10, 10a, and . . . in association with identification information of a camera that captures the captured video (in other words, positional information of an intersection at which the corresponding camera is installed) and information of a capturing time and date. In addition, the accumulation unit 56 records information of a road map indicating positions of intersections where the cameras 10, 10a, and . . . are installed. For example, whenever the information on the road map is updated due to new road construction, maintenance work, or the like, the accumulation unit 56 records information of the updated road map. In addition, the accumulation unit 56 records intersection camera installation data indicating a correspondence between one camera installed at each intersection and the intersection. In the intersection camera installation data, for example, identification information of the intersection and identification information of the camera are associated with each other. Accordingly, the accumulation unit 56 records captured video data of the camera in association with information of a capturing time and date, camera information, and intersection information. The information of the road map is recorded in the memory 95 of the client terminal 90.

In addition, the accumulation unit 56 includes the analysis information DB 56a and a case DB 56b.

The analysis information DB 56a stores an output of the tag assignment unit 55 (that is, a set of the person information that is obtained by the person analysis unit 54 analyzing the captured video of the camera, and the information of the time and date and the point of the captured video that is used for the analysis). The analysis information DB 56a is inquired, for example, when the person search unit 53 extracts the person information that satisfies the characteristic information included in the search request for the search target person.

Whenever a case such as an incident occurs, the case DB 56b registers and stores an eyewitness report such as a time and date and a point of the occurrence of the case and case detailed information (for example, map data MP1, search conditions, and data of cut-out images as search results) such as data of search results of the person search unit 53 based on the eyewitness report and the search request for the search target person from the client terminal 90. Examples of the case detailed information include case information such as a time and date and a point of the occurrence of the case, thumbnail images (the above-described cut-out images) of the searched person, surrounding map information including a point of the occurrence of the case, a direction in which the person moves into or out from an intersection, a time when the person passes through an intersection, and a user memo. The case detailed information is not limited to the above-described examples.

The client terminal 90 is configured to include an operation unit 91, a processor 92, a communication unit 93, a display 94, a memory 95, and a recording unit 96. The client terminal 90 is used by a staff in a police station (that is, a police officer as a user). When an eyewitness of an incident or the like calls to inform the user of the occurrence of the incident or the like, the user wears a headset HDS and answers the call. The headset HDS is connected to the client terminal 90 to be used and collects a sound emitted by the user or outputs a sound emitted by the conversation partner (that is, the informer).

The operation unit 91 is a user interface (UI) that detects an operation of the user and is configured using a mouse, a keyboard, or the like. The operation unit 91 outputs a signal to the processor 92 based on the operation of the user. For example, in order to verify a time and date of the occurrence of a case such as an incident that is investigated by the user and a captured video of an intersection at a point thereof, the operation unit 91 receives an input of search conditions including the time and date, the point, and characteristics of the person.

The processor 92 is configured using, for example, a CPU, a DSP, or a FPGA, functions as a controller of the client terminal 90, and executes a control process for integrating overall operations of the respective units of the client terminal 90, a process of inputting and outputting data between the respective units of the client terminal 90, a data arithmetic operation (computation) process, and a data storage process. The processor 92 operates according to a program and data stored in the memory 95. The processor 92 acquires current time information using the memory 95 during an operation, or displays search results of the search target person transmitted from the person search server 50 or a captured video transmitted from the video recorder 70 on the display 94. In addition, the processor 92 generates a search request for the search target person that includes the search conditions input by the operation unit 91, and transmits the search request to the person search server 50 through the communication unit 93.

The communication unit 93 communicates with the person search server 50 or the video recorder 70 connected through the network NW2 such as an intranet. For example, the communication unit 93 transmits the search request generated by the processor 92 to the person search server 50, or receives the search results of the search target person transmitted from the person search server 50. In addition, the communication unit 93 transmits an acquisition request to the video recorder 70 to acquire the captured video generated by the processor 92, or receives a captured video transmitted from the video recorder 70 in response to the acquisition request.

The display 94 is configured using, for example, a display device such as a liquid crystal display (LCD) or an organic electroluminescence (EL) and displays various data transmitted from the processor 92.

The memory 95 is configured using, for example, a RAM and a ROM and temporarily stores a program and data required for executing the operation of the client terminal 90, information or data generated during the operation, and the like. The RAM is, for example, a work memory used during the operation of the processor 92. The ROM stores, for example, a program and data for controlling the processor 92 in advance. In addition, the memory 95 stores, for example, identification information (for example, a serial number) for identifying the client terminal 90 and various setting information.

The recording unit 96 is configured using, for example, a hard disk drive or a solid-state drive. In addition, the recording unit 96 records information of a road map indicating positions of intersections where the cameras 10, 10a, and ... are installed. For example, whenever the information on the road map is updated due to new road construction, maintenance work, or the like, the recording unit 96 records information of the updated road map. In addition, the recording unit 96 records intersection camera installation data indicating a correspondence between one camera installed at each intersection and the intersection. In the intersection camera installation data, for example, identification information of the intersection and identification information of the camera are associated with each other. Accordingly, the recording unit 96 records captured video data of the camera in association with information of a capturing time and date, camera information, and intersection information.

Figure 4:
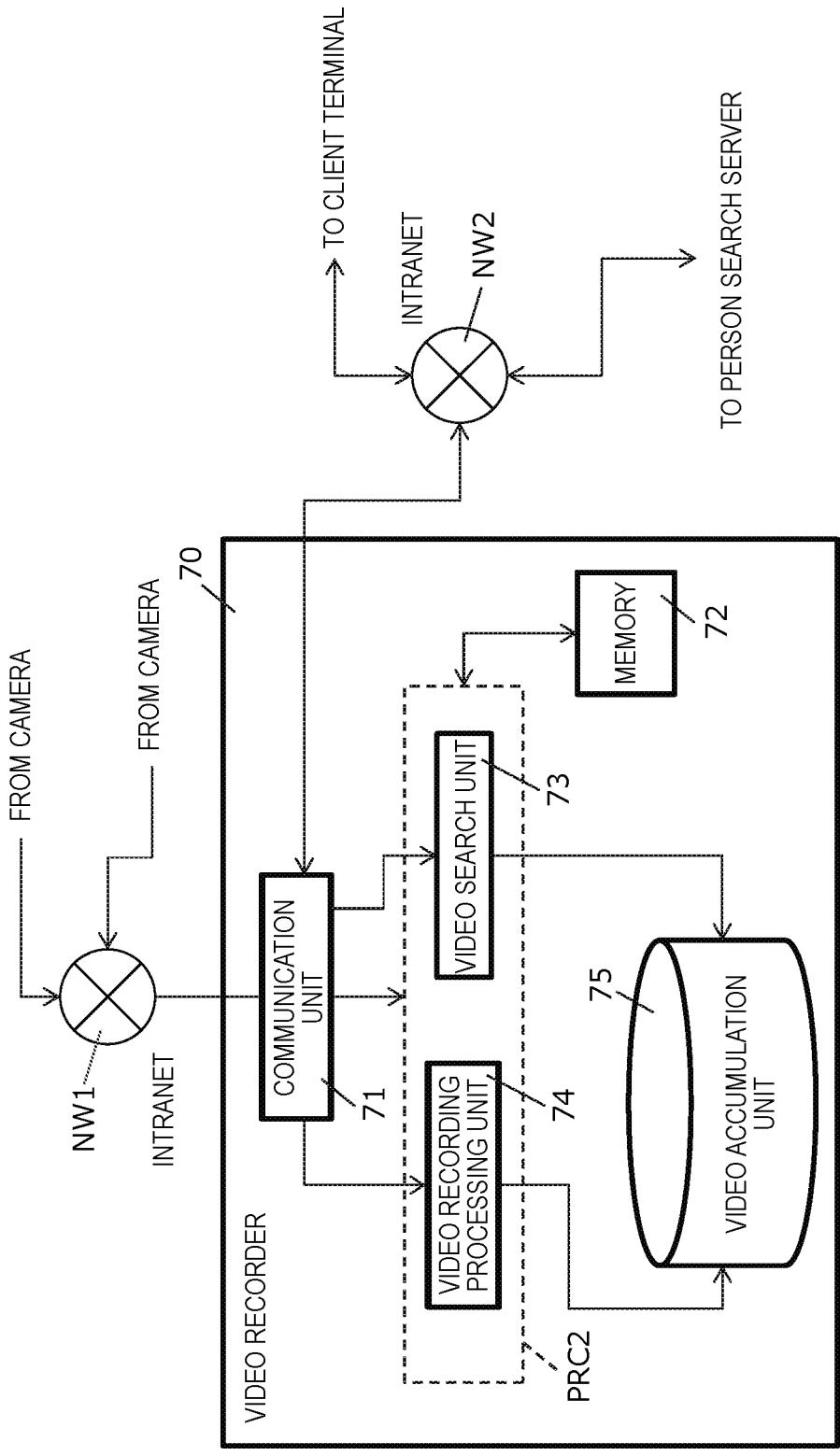
FIG. 4 is a block diagram illustrating an internal configuration example of a video recorder.

FIG. 4 is a block diagram illustrating an internal configuration example of the video recorder 70. The video recorder 70 is communicatively connected to each of the cameras 10, 10a, and ... connected through the network NW1 such as an intranet and is communicatively connected to the person search server 50 and the client terminal 90 through the network NW2 such as an intranet.

The video recorder 70 is configured to include a communication unit 71, a memory 72, a video search unit 73, a video recording processing unit 74, and a video accumulation unit 75. The video search unit 73 and the video recording processing unit 74 are configured using, for example, a processor PRC2 such as a CPU, a DSP, or an FPGA.

The communication unit 71 communicates with each of the cameras 10, 10a, and ... connected through the network NW1 such as an intranet to receive data of a captured video (that is, a video indicating the state of persons that come and go at an intersection) transmitted from each of the cameras 10, 10a, and. . . . In addition, the communication unit 71 communicates with the client terminal 90 through the network NW2 such as an intranet provided in a police station to receive a video request transmitted from the client terminal 90 or to transmit a response of the video request.

The memory 72 is configured using, for example, a RAM and a ROM and temporarily stores a program and data required for executing the operation of the video recorder 70, information or data generated during the operation, and the like. The RAM is, for example, a work memory used during the operation of the processor PRC2. The ROM stores, for example, a program and data for controlling the processor PRC2 in advance. In addition, the memory 72 stores, for example, identification information (for example, a serial number) for identifying the video recorder 70 and various setting information.

The video search unit 73 extracts captured videos of the cameras that satisfy the video request transmitted from the client terminal 90 by searching the video accumulation unit 75 based on the video request. The video search unit 73 transmits the extracted captured video data to the client terminal 90 through the communication unit 71.

For example, whenever the communication unit 71 receives captured video data from each of the cameras 10, 10a, and ..., the video recording processing unit 74 records the received captured video data in the video accumulation unit 75.

The video accumulation unit 75 is configured using, for example, a hard disk drive or a solid-state drive. The video accumulation unit 75 records the captured video data transmitted from each of the cameras 10, 10a, and ... in association with identification information of a camera that captures the captured video (in other words, positional information of an intersection at which the corresponding camera is installed) and information of a capturing time and date.

Next, various examples of the screen displayed on the display 94 of the client terminal 90 during a police investigation will be described with reference to FIGS. 5 to 9. In the description of FIGS. 5 to 9, the same components as those illustrated in the drawings are denoted with the same reference numerals, and the description thereof will be simplified or omitted.

During the police investigation, the client terminal 90 activates and executes a person search application that is installed in advance therein (hereinafter, referred to as "person search application") through an operation of a police officer (one aspect of the user). A program and data of the person search application are stored in the ROM of the memory 95 of the client terminal 90. The person search application is activated and executed by the processor 92 through an operation of the police officer. During the activation of the person search application, various data or information created by the processor 92 are temporarily stored in the RAM of the memory 95.

Figure 5:
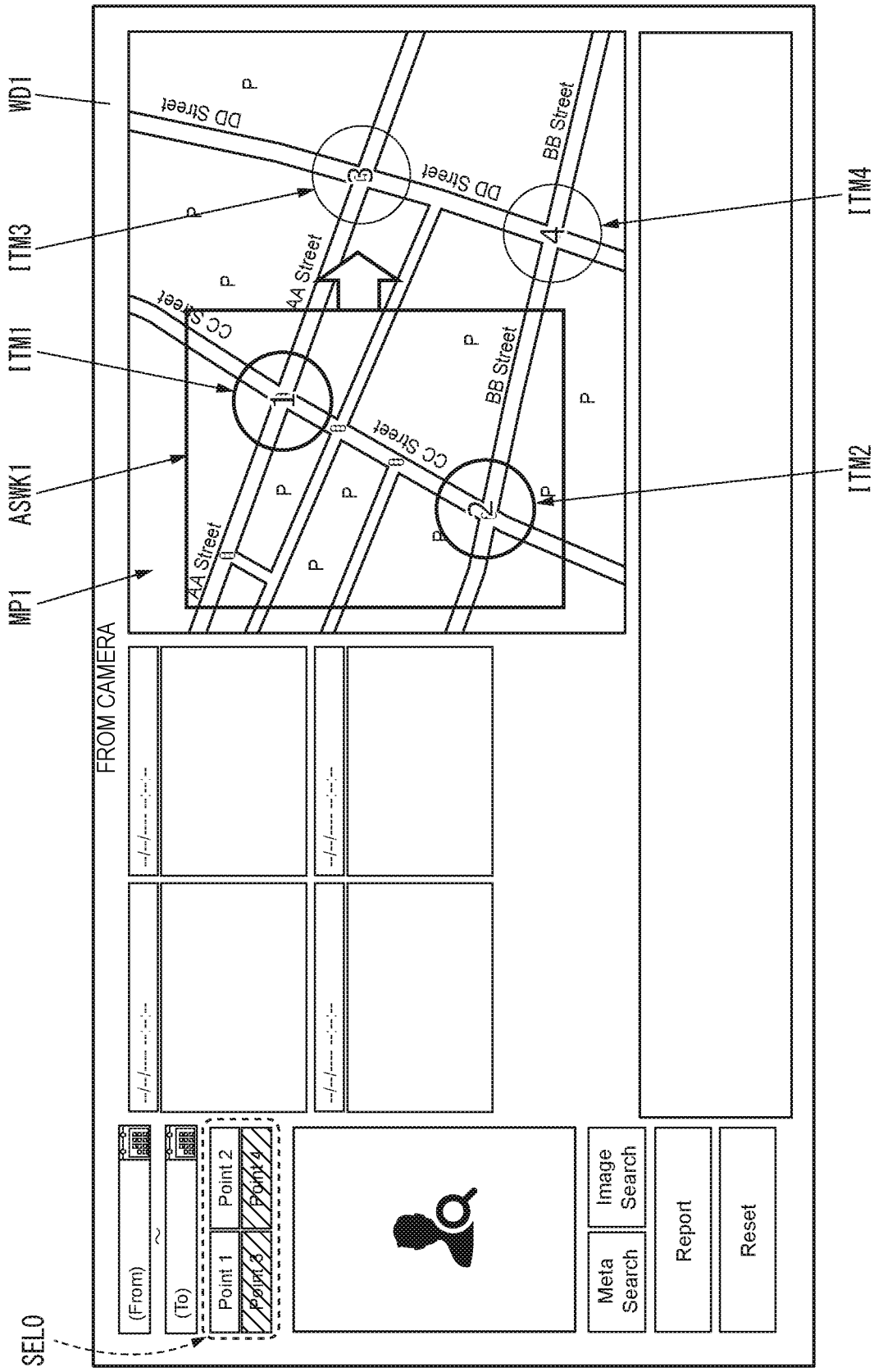
FIG. 5 is a diagram illustrating an example of a person search screen that displays map data including intersections where cameras are installed.

FIG. 5 is a diagram illustrating an example of a person search screen WD1 that displays map data MP1 including intersections where cameras are installed. The processor 92 displays the person search screen WD1 (one aspect of the screen) on the display 94 after the activation of the person search application. The person search screen WD1 is configured to align and display both of the map data MP1 corresponding to the information of the road map recorded in the recording unit 96 of the client terminal 90 and a plurality of search condition entry fields. In the following description, the person search application that is executed by the processor 92 communicates with the person search server 50 or the video recorder 70 during the execution.

On the map data MP1, for example, an icon ITM1 indicating a position of a first camera that is disposed at an intersection between "AA Street" and "CC Street", an icon ITM2 indicating a position of a second camera that is disposed at an intersection between "BB Street" and "CC Street", an icon ITM3 indicating a position of a third camera that is disposed at an intersection between "AA Street" and "DD Street", and an icon ITM4 indicating a position of a fourth camera that is disposed at an intersection between "BB Street" and "DD Street" are displayed to be distinguishable from each other. Accordingly, in the following description, a parameter n (n: an integer of 3 or greater) indicating the number of installed cameras is set as "4".

In the following description, for the convenience of description, the name of the intersection between "AA Street" and "CC Street" is set as "Point 1", the name of the intersection between "BB Street" and "CC Street" is set as "Point 2", the name of the intersection between "AA Street" and "DD Street" is set as "Point 3", and the name of the intersection between "BB Street" and "DD Street" is set as "Point 4". In addition, the first camera, the second camera, the third camera, and the fourth camera have the same configuration as each of the cameras 10, 10a, and ... illustrated in FIG. 2.

In addition, the person search application displays a camera selection frame ASWK1 on the map data MP1 by a user operation. The camera selection frame ASWK1 is used for selection of captured videos (for example, live videos) of cameras displayed on the person search screen WD1. For example, in FIG. 5, the first camera and the second camera are selected by a user operation through the camera selection frame ASWK1. The person search application displays a point selection frame SEL0 on the person search screen WD1 in response to the selection through the camera selection frame ASWK1, the point selection frame SEL0 indicating that the installation points (that is, "Point 1" and "Point 2") of the cameras selected by the user operation (specifically, the first camera and the second camera) are display targets of the captured videos on the person search screen WD1. The shape of the camera selection frame ASWK1 is not limited to a rectangular shape as illustrated in FIG. 5 and may be any one of various well-known shapes such as a circle, an ellipse, or a triangle.

Figure 6:
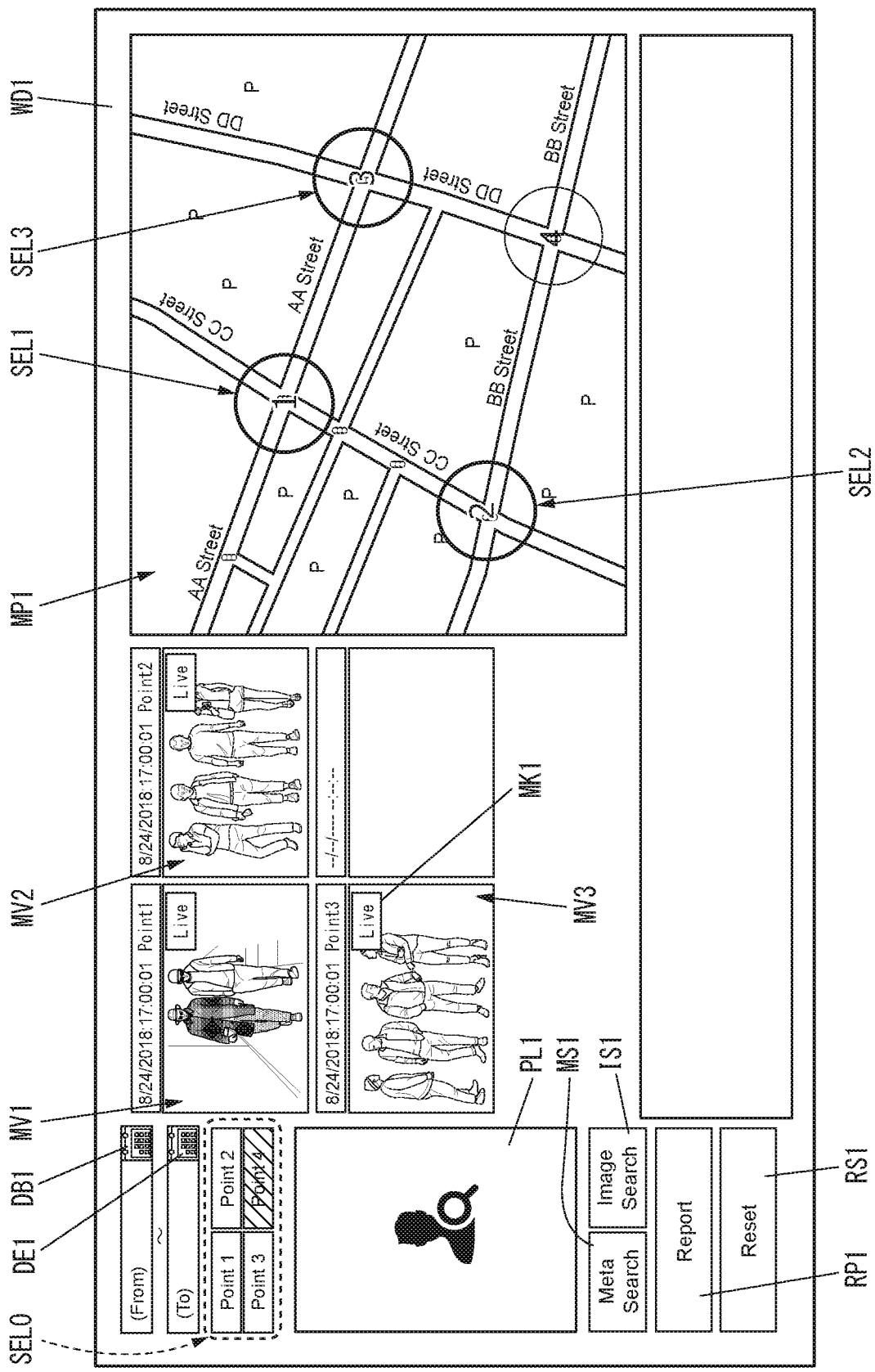
FIG. 6 is a diagram illustrating an example of the person search screen that displays captured videos (live videos) of selected cameras.

FIG. 6 is a diagram illustrating an example the person search screen WD1 that displays captured videos (live videos) of the selected cameras. As illustrated in FIG. 6, a k (k: an integer of 2 or greater that satisfies k≤n) number of cameras (specifically, k=3; and the first camera corresponding to k=1, the second camera corresponding to k=2, and the third camera corresponding to k=3) on the map data MP1 are selected by a user operation through the camera selection frame ASWK1. In order to indicate that the icons ITM1, ITM2, and ITM3 are selected through the camera selection frame ASWK1, the person search application changes a display manner of the icons ITM1, ITM2, and ITM3 to be different from that of the other icon ITM4. Specifically, the person search application displays selected icons SEL1, SEL2, and SEL3 by redrawing the icons ITM1, ITM2, and ITM3 with a specific color (for example, red). As a result, the person search application displays the point selection frame SEL0 on the person search screen WD1, the point selection frame SEL0 indicating that the three points "Point 1", "Point 2", and "Point 3" corresponding to the first camera, the second camera, and the third camera, respectively, are display targets of the captured videos on the person search screen WD1.

The person search application displays a display screen of a captured video MV1 (live video) of the first camera (that is, the point "Point 1") corresponding to the point selection frame SEL0 or the selected icon SEL1 on the person search screen WD1 together with a capturing time and a captured point name. Likewise, the person search application displays a display screen of a captured video MV2 (live video) of the second camera (that is, the point "Point 2") corresponding to the point selection frame SEL0 or the selected icon SEL2 on the person search screen WD1 together with a capturing time and a captured point name. Likewise, the person search application displays a display screen of a captured video MV3 (live video) of the third camera (that is, the point "Point 3") corresponding to the point selection frame SEL0 or the selected icon SEL3 on the person search screen WD1 together with a capturing time and a captured point name. The person search application displays a live marker Mk1 on each of the captured videos MV1, MV2, and MV3 in order to indicate that the captured video is a live video.

For example, when the person search server 50 cannot receive a captured video (live video) from at least one (for example, the first camera) of the first camera, the second camera and the third camera, the client terminal 90 may request the video recorder 70 for captured video data that is previously captured at "Point 1" where the camera (for example, the first camera) is installed and is stored in the video recorder 70. In this case, the client terminal 90 may receive previously captured video data of "Point 1" transmitted from the video recorder 70 in response to the request from the client terminal 90 to display the received captured video on the person search screen WD1. In addition, for example, when the person search server 50 cannot receive a captured video (live video) from at least one (for example, the first camera) of the first camera, the second camera and the third camera, the client terminal 90 may acquire captured video data input through an external terminal (not illustrated) of the client terminal 90 or captured video data previously stored in the recording unit 96 to display the acquired captured video data on the person search screen WD1.

In addition, the person search application displays various buttons on the person search screen WD1 to support the search of the search target person in the police investigation. For example, a period start button DB1 for selecting a start time of a search target period and a period end button DE1 for selecting an end time of the search target period are disposed. In addition, a search target person image display frame PL1 indicating an appearance image or impression of the search target person to be searched for is disposed.

In addition, the person search application can cause the person search server 50 to execute a search request in two types of search methods for the search of the search target person. A first search method is a method of a meta search in which, for example, based on meta information set on a setting screen DTL1 illustrated in FIG. 7, a search target person having a characteristic with a similarity that is the same as or within a predetermined value from the characteristic in the meta information is searched for. In the first embodiment, the meta search will be described. The person search application displays a meta search button MS1 on the person search screen WD1 to request the person search server 50 for the meta search.

Figure 11:
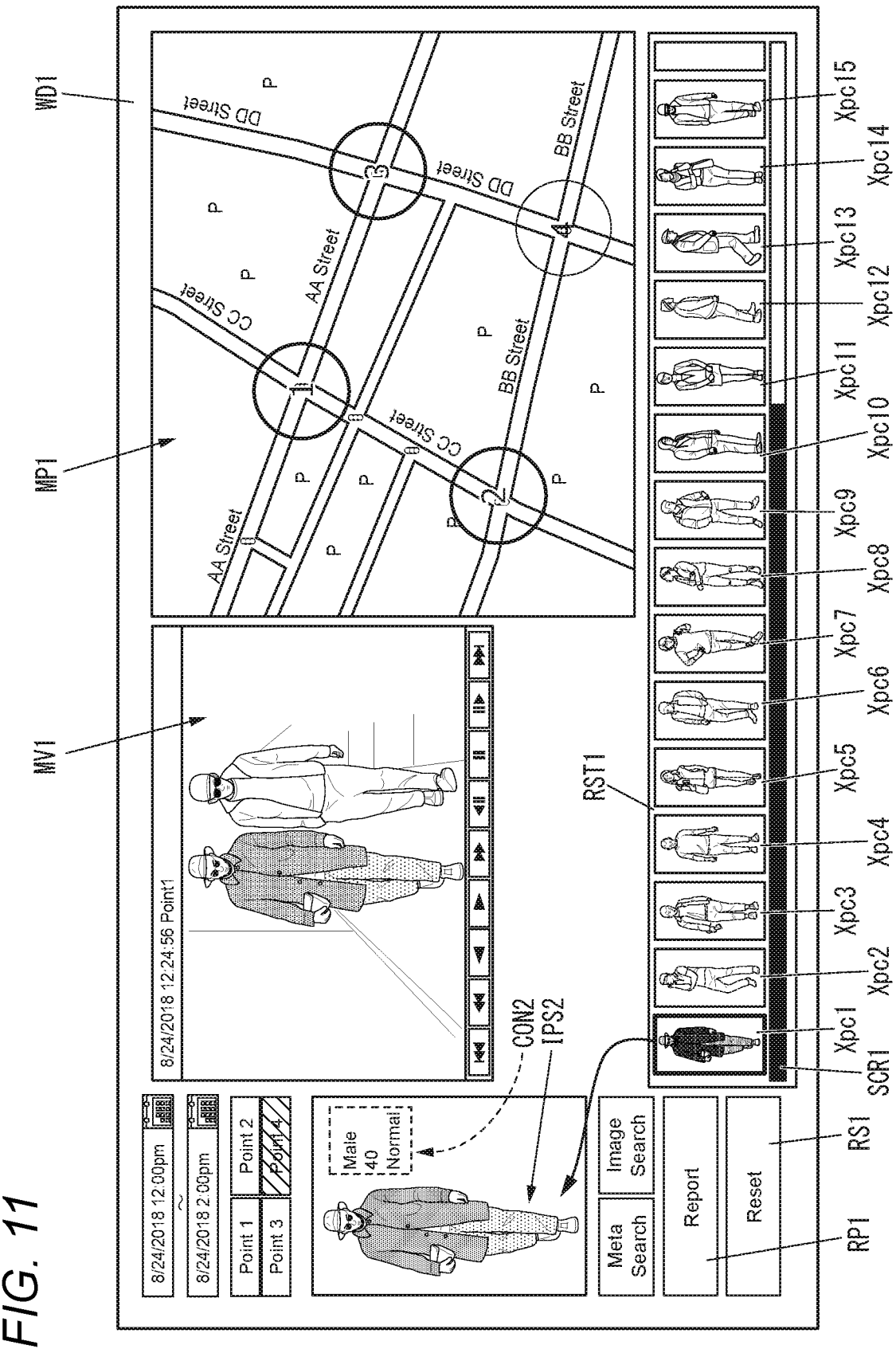
FIG. 11 is a diagram illustrating a setting example for search conditions of an image search of a selected cut-out image.
Figure 12:
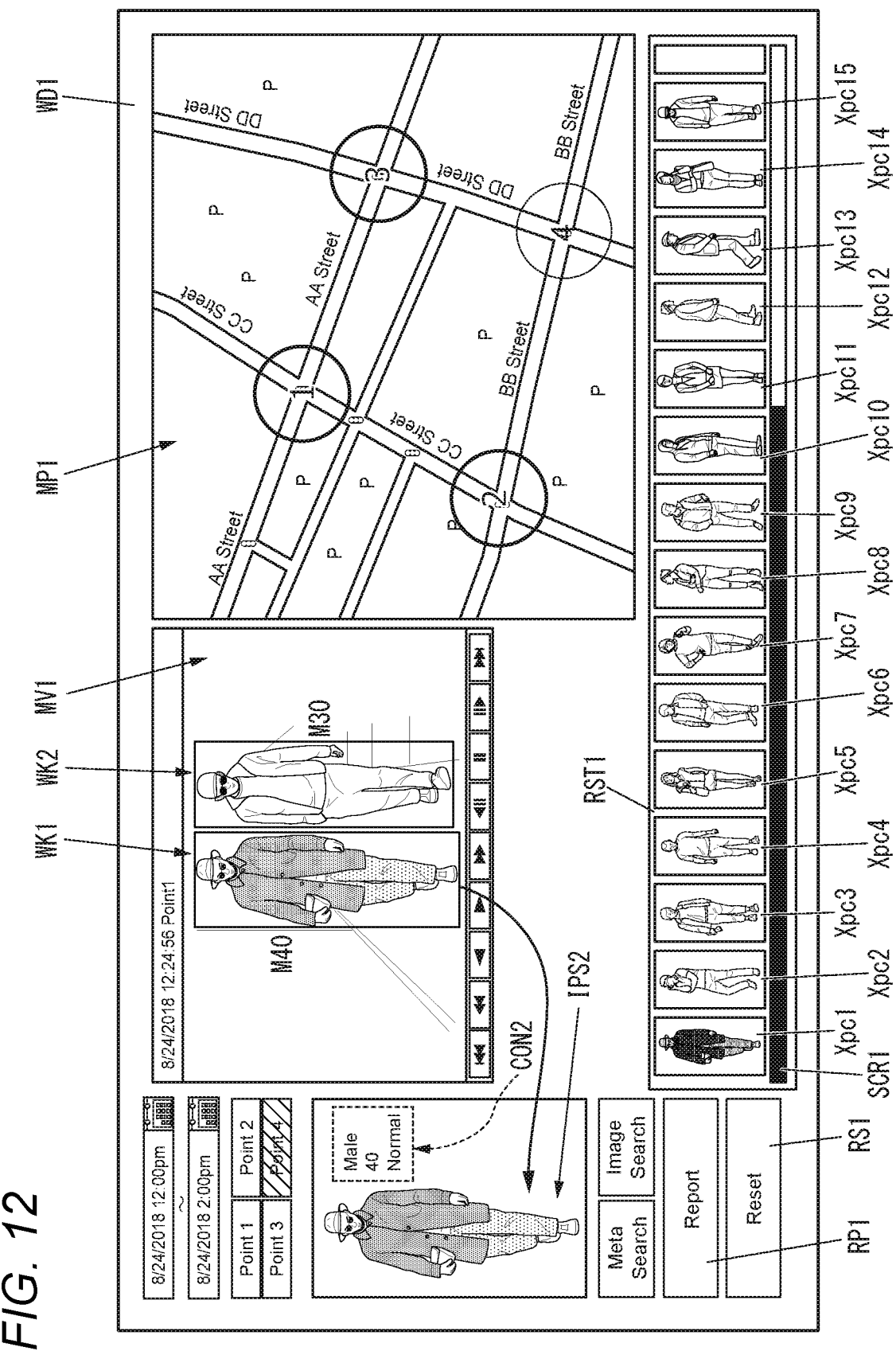
FIG. 12 is a diagram illustrating a setting example of search conditions of the image search in which person frames that are displayed on the reproduction screen of the captured video of FIG. 9 are used.

A second search method is a method of an image search in which, for example, based on image data selected in a cut-out image XPc1 illustrated in FIG. 11 or a person frame WK1 illustrated in FIG. 12, a search target person having a characteristic with a similarity that is the same as or within a predetermined value from the characteristic in the image data is searched for. In a second embodiment, the image search will be described. The person search application displays an image search button IS1 on the person search screen WD1 to request the person search server 50 for the image search.

In addition, the person search application displays a report button RP1 on the person search screen WD1 to store data of search results of the search target person on the person search screen WD1 as a case report. When the report button RP1 is selected by a user operation, the person search application stores the data of search results of the search target person on the person search screen WD1 (for example, the map data MP1, search conditions, and data of cut-out images as search results) in the recording unit 96 as the case report. In addition, the client terminal 90 may transmit the data of the case report to the person search server 50 in association with identification information (for example, a file name) of the case report. The person search server 50 stores the data of the case report in the case DB 56b in association with the identification information (for example, a file name) of the case report.

In addition, the person search application displays a reset button RS1 on the person search screen WD1 to return the displayed person search screen WD1 to an initial state of the person search screen WD1 (in other words, a state before starting the search of the search target person). As a result, for example, when the user executes an incorrect operation during the search of the search target person on the person search screen WD1, the user can easily reset the search of the search target person from the beginning.

Figure 7:
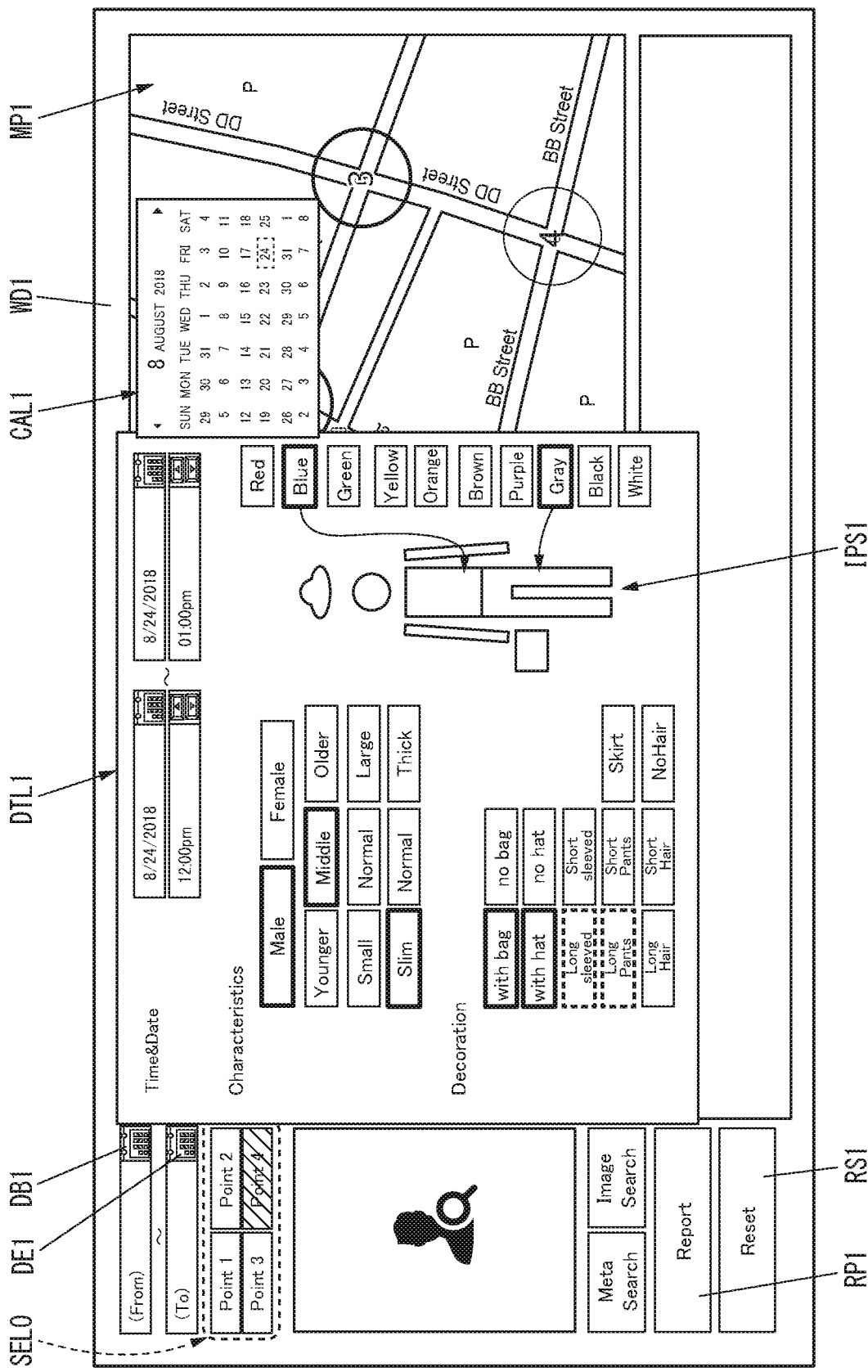

FIG. 7 is a diagram illustrating an example of the setting screen DTL1 for characteristic information of the search target person to be searched for. The person search application displays the setting screen DTL1 in which "Time&Date", "Characteristics", and "Decoration" can be selected by the user as three key factors of search conditions for searching the search target person to overlap the person search screen WD1 by a user operation. In addition, the person search application displays a search target person image IPS1 specified by setting "Characteristics" and "Decoration" through a user operation, on the setting screen DTL1. As a result, the user can visually verify the search target person image IPS1 corresponding to "Characteristics" and "Decoration" set by the user, and thus, and thus, the appropriateness of the setting can be easily determined.

On "Time&Date", a calendar icon for setting each of the start time and the end time of the search period of the search target person is displayed. For example, when the calendar icon on "Time&Date" is selected by a user operation, the person search application displays a calendar box CAL1 to overlap the map data MP1. As a result, the start time and the end time of the search period of the search target person can be selected by a user operation. Instead of selecting the calendar icon, the start time and the end time of the search period of the search target person may be directly input by a user operation. For example, in FIG. 7, "12 pm, Aug. 24, 2018" to "1 pm, Aug. 24, 2018" is selected as "Time&Date".

In addition, options of information regarding some of the appearance characteristics of the search target person are selectably displayed on "Characteristics". The displayed options include options regarding the sex (specifically, "Male" or "Female"), options regarding the age (specifically, "Younger", "Middle", or "Older"), options regarding the height (specifically, "Small", "Normal", or "Large"), and options regarding the body shape (specifically, "Slim", "Normal", or "Thick"). As a result, the user can finely select appearance characteristics such as the sex or the size of the search target person. For example, in FIG. 7, "Male", "Older" and "Slim" are selected as "Characteristics".

In addition, options of information regarding some of the appearance characteristics of the search target person are selectably displayed on "Decoration". The displayed options include options regarding belongings (specifically, "with bag" or "no bag"), options regarding ornaments (specifically, "with hat" or "no hat"), options regarding the clothes of the upper body (specifically, "Long Sleeved" or "Short Sleeved"), options regarding the decoration of the lower body (specifically, "Long Pants", "Short Pants", or "Skirt"), and options regarding the hairstyle (specifically, "Long Hair", "Short Hair", or "No Hair"). In addition, regarding each of the clothes, the belongings and the ornaments, the color can also be selected. For example, the color can be selected from "Red", "Blue", "Green", "Yellow", "Orange", "Brown", "Purple", "Gray", "Black" and "White". As a result, the user can finely select appearance characteristics such as the decoration of the search target person. For example, in FIG. 7, "with bag", "with hat", "Long sleeved" and "Long Pants" are selected as "Decoration", "Blue" is selected regarding the clothes of the upper body, and "Gray" is selected regarding the clothes of the lower body.

Figure 8:
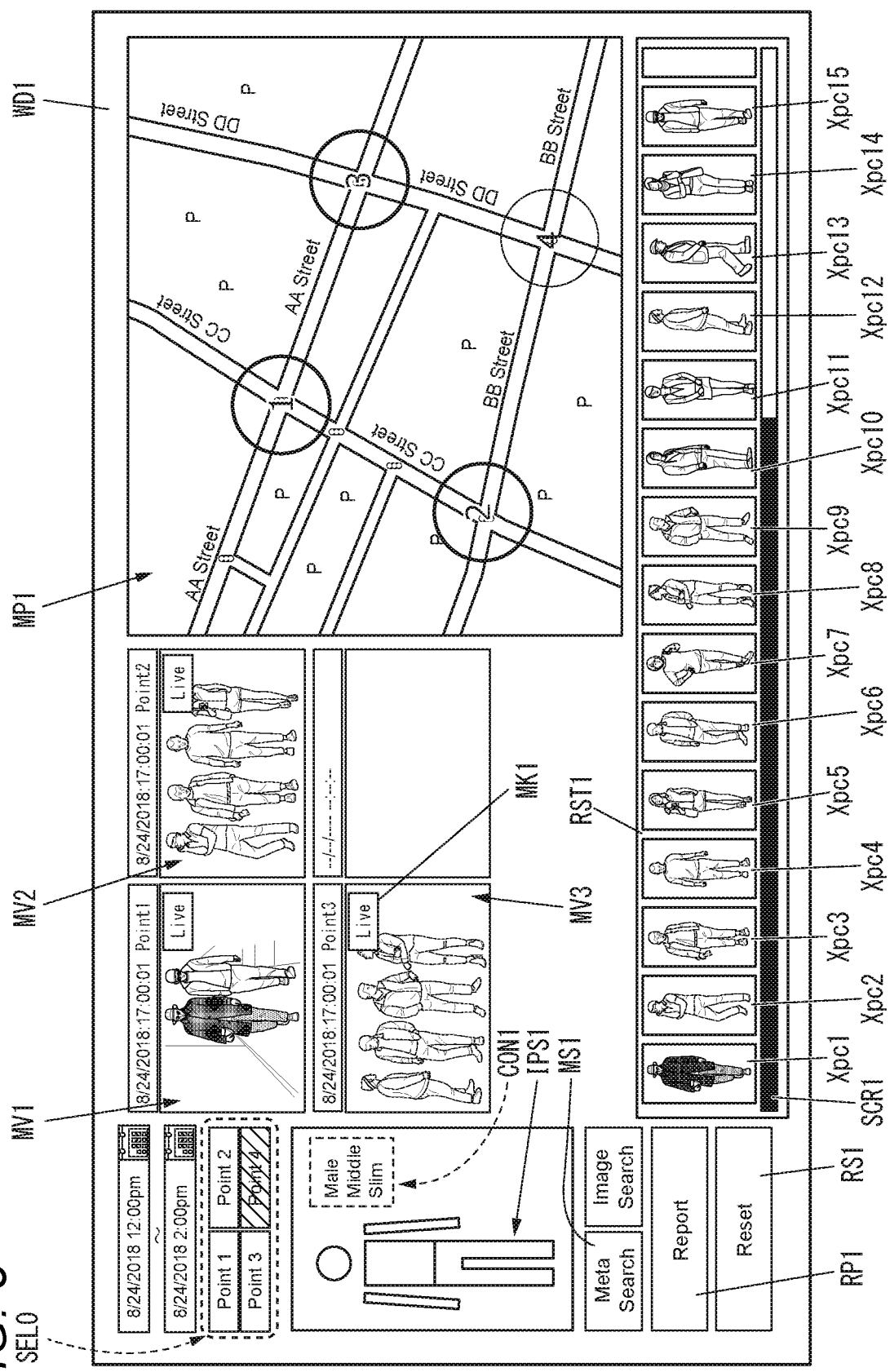
FIG. 8 is a diagram illustrating an example of the person search screen that chronologically displays person search results in a meta search in which set characteristic information is used as search conditions.

FIG. 8 is a diagram illustrating an example of the person search screen WD1 that chronologically displays person search results in the meta search in which the set characteristic information is used as search conditions. The person search application displays the search target person image IPS1 and partial search conditions CON1, which are selected on the setting screen DTL1 in FIG. 7, on the search target person image display frame PL1.

In a state where the search target person image IPS1 is displayed on the search target person image display frame PL1, the person search application detects that the meta search button MS1 is pressed by a user operation. In this case, the person search application (specifically, the processor 92) generates a search request for the search target person that includes various search conditions (for example, the time and date indicating the search period and the characteristic information of the search target person) for specifying the search target person image IPS1 displayed on the search target person image display frame PL1, and identification information of a camera as a search target; and transmits the generated search request to the person search server 50 through the communication unit 93. When the search request transmitted from the client terminal 90 is received, the person search server 50 uses the analysis results stored in the analysis information DB 56a of the accumulation unit 56 to search for persons (for example, a person having a similarity that is higher than or equal to a predetermined threshold of similarity) identical with or similar to the search target person who satisfy various search conditions included in the search request through the meta search. The person search server 50 transmits the search results to the client terminal 90.

When the search results are acquired through the communication unit 93, the person search application (specifically, the processor 92) aligns and displays cut-out images Xpc1, Xpc2, Xpc3, Xpc4, Xpc5, Xpc6, Xpc7, Xpc8, Xpc9, Xpc10, Xpc11, Xpc12, Xpc13, Xpc14, Xpc15, and . . . of the persons identical with or similar to the search target person (that is, the search target person image IPS1) in a list display frame RST1. Each of the cut-out images is, for example, a thumbnail image. When all the cut-out images cannot be displayed in the list display frame RST1, the person search application can display the remaining cut-out images by scrolling a scroll bar SCR1 with a user operation. This shall be applied to the embodiments described below.

For example, the person search application may display the cut-out images Xpc1, Xpc2, Xpc3, Xpc4, Xpc5, Xpc6, Xpc7, Xpc8, Xpc9, Xpc10, Xpc11, Xpc12, Xpc13, Xpc14, Xpc15, and . . . of the persons identical with or similar to the search target person (that is, the search target person image IPS1) in order from the highest similarity to the search target person image IPS1. As a result, the user can promptly detect the search target person who is desired to be grasped by preferentially checking the displayed cut-out images without scrolling the scroll bar SCR1.

For example, the person search application may chronologically display the cut-out images Xpc1, Xpc2, Xpc3, Xpc4, Xpc5, Xpc6, Xpc7, Xpc8, Xpc9, Xpc10, Xpc11, Xpc12, Xpc13, Xpc14, Xpc15, and . . . of the persons identical with or similar to the search target person (that is, the search target person image IPS1) in order of capturing times at which the respective cut-out images are captured (for example, in order from the oldest capturing time or the newest capturing time). As a result, the user can promptly detect the search target person who is desired to be grasped by preferentially checking the cut-out images that are displayed in order from the oldest capturing time or the newest capturing time.

For example, the person search application may display the cut-out images Xpc1, Xpc2, Xpc3, Xpc4, Xpc5, Xpc6, Xpc7, Xpc8, Xpc9, Xpc10, Xpc11, Xpc12, Xpc13, Xpc14, Xpc15, and . . . of the persons identical with or similar to the search target person (that is, the search target person image IPS1) collectively according to intersections where cameras corresponding to the cut-out images are installed. As a result, for example, when an intersection where the search target person is likely to be present is grasped, the user can promptly detect the search target person who is desired to be grasped by preferentially checking one or a plurality of cut-out images that are collectively displayed according to the intersection.

Figure 9:
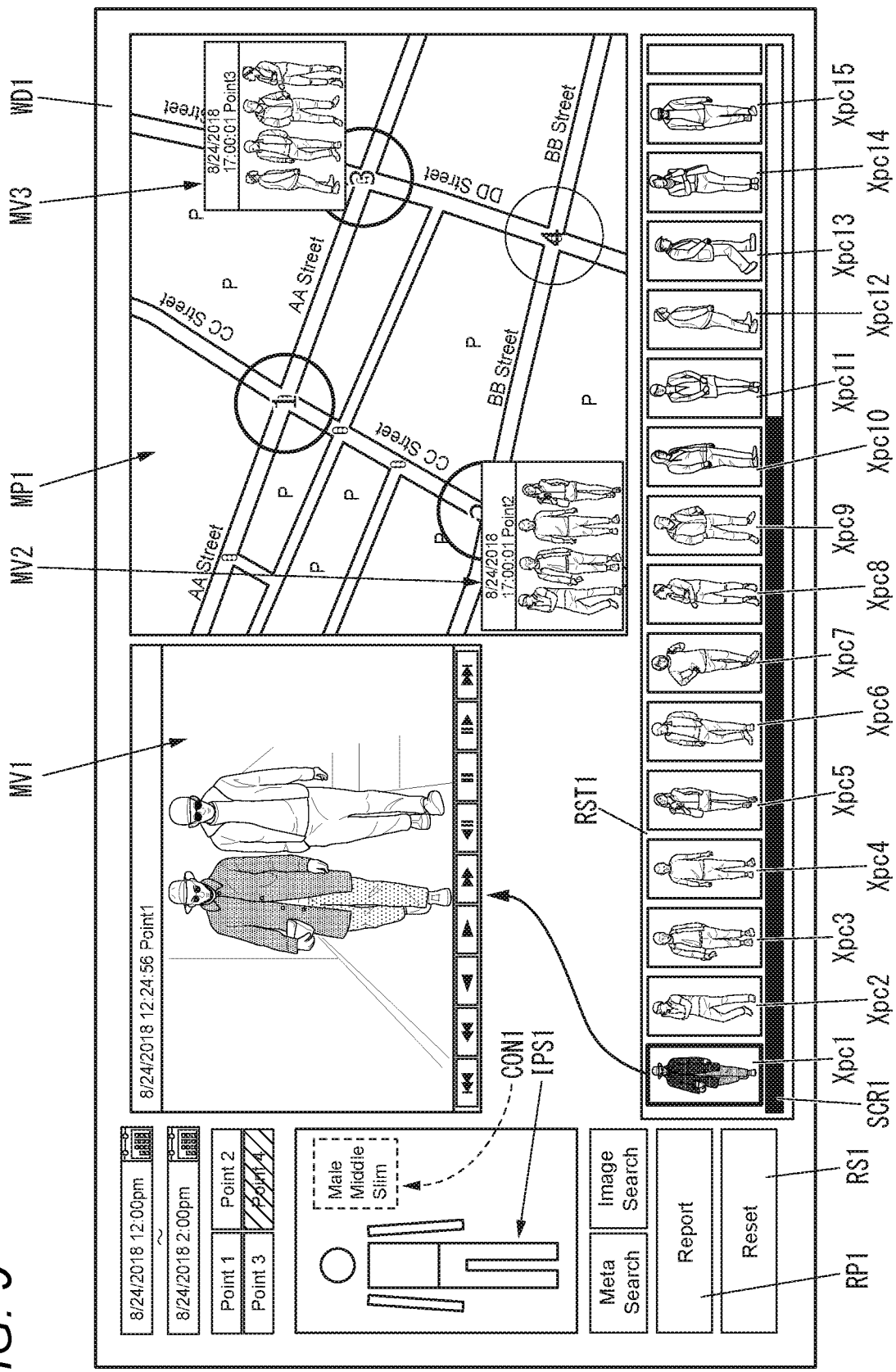
FIG. 9 is a diagram illustrating a display example of a reproduction screen of a captured video corresponding to a selected cut-out image.

FIG. 9 is a diagram illustrating a display example of a reproduction screen of the captured video MV1 corresponding to the selected cut-out image Xpc 1. The person search application detects that one cut-out image (for example, the cut-out image Xpc1) is selected from the plurality of cut-out images Xpc1 to Xpc 15 and . . . displayed in the list display frame RST1 by a predetermined user operation. In this case, the person search application displays a reproduction screen that can display the captured video MV1 corresponding to the selected cut-out image Xpc 1 (that is, the captured video of the camera when a person appearing in the captured video Xpc1 is captured). The person search application disposes and displays icons to receive various user operations such as "Play", "Pause", "Fast Forward", "Fast Backward", "Skip to Start", or "Play Next Video" on the reproduction screen.

In addition, in response to the display of the reproduction screen of the captured video MV1, the person search application changes the disposition of a display screen of the captured videos MV2 and MV3, which are displayed before the selection of the cut-out image (for example, the cut-out image Xpc1), to the vicinity of the corresponding intersection of the map data MP1. As a result, the user can intuitively and visually grasp a correlation between the display screen of the captured videos MV2 and MV3 and the position of the corresponding intersection and can efficiently support the police investigation.

Figure 10:
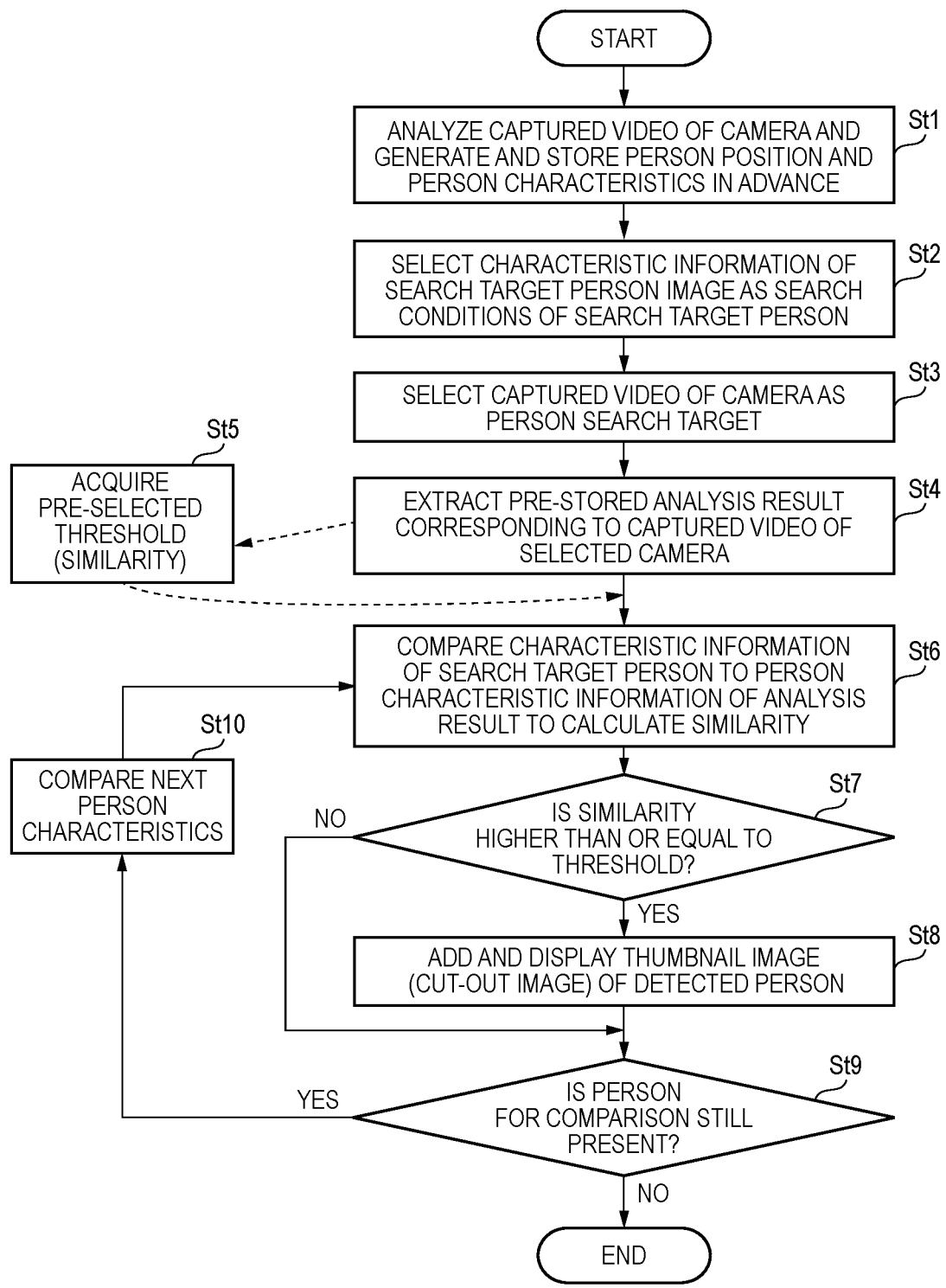
FIG. 10 is a flowchart illustrating an operational procedure example of a person search system according to a first embodiment.

Next, an operational procedure of the person search system 100 according to the first embodiment will be described with reference to FIG. 10. FIG. 10 is a flowchart illustrating the operational procedure example of the person search system 100 according to the first embodiment. Processes illustrated in FIG. 10 are executed by the client terminal 90 and the person search server 50.

In FIG. 10, whenever the captured video data transmitted from each of the cameras 10, 10a, and . . . constituting the person search system 100 is received, the person search server 50 analyzes the captured video data. The person search server 50, by the analysis, generates information regarding a person (for example, a cut-out image in which the person appears, characteristics of the person, a position of the person, or a moving direction in which the person passes through an intersection) as an analysis result and stores the analysis result in the analysis information DB 56a of the accumulation unit 56 (St1). This process of Step St1 is executed before the person search server 50 acquires a search request from the client terminal 90.

As search conditions of the search target person (for example, the search target person image IPS1), the client terminal 90 receives a selection (refer to FIG. 7) by a user operation of various characteristic information for forming the search target person image IPS1 (St2). The client terminal 90 receives a selection of a captured video of a camera as a search target for the search target person by a user operation (St3). The steps of Steps St2 and St3 may be executed in no particular order. After Steps St2 and St3, for example, after the client terminal 90 detects that the meta search button MS1 is pressed by a user operation, the client terminal 90 generates a search request for the search target person that includes various search conditions (for example, the time and date indicating the search period or the characteristic information of the search target person) for specifying the search target person image IPS1 displayed on the search target person image display frame PL1, and identification information of a camera as a search target; and transmits the generated search request to the person search server 50.

When the search request transmitted from the client terminal 90 is received, the person search server 50 acquires an analysis result (refer to Step St1) of a captured video corresponding to identification information of the camera that is a search target at a time and date indicating a search period included in the search request, from the analysis information DB 56a (St4). The person search server 50 reads information regarding a pre-selected threshold of similarity from, for example, the memory 52 to set the threshold (St5). After Step St5, the person search server 50 compares the analysis result (the information regarding the person) extracted in Step St4 to the characteristic information (refer to FIG. 7) of the search target person that is included in the search request transmitted from the client terminal 90 through the meta search to calculate a similarity (St6).

The person search server 50 determines whether or not the similarity calculated in Step St6 is higher than or equal to the threshold (refer to Step St5) (St7). When the person search server 50 determines that the calculated similarity is higher than or equal to the threshold (St7, YES), the person search server 50 transmits data of a cut-out image (for example, a thumbnail image) in which the person having a similarity higher than the threshold appears to the client terminal 90 as an example of a search result and also transmits an instruction to the client terminal 90 to display the cut-out image (St8). The client terminal 90 displays the cut-out images on the list display frame RST1 of the person search screen WD1 based on the instruction transmitted from the person search server 50 (St8). As described above, when a plurality of cut-out images to be displayed on the list display frame RST1 are received, the client terminal 90 may display these cut-out images in order from the highest similarity, in chronological order or in order of intersections.

On the other hand, when the person search server 50 determines that the calculated similarity is lower than the threshold (St7, NO), the process of Step St8 is omitted. Next or after Step St8, the person search server 50 determines whether or not a person as a target for the comparison of whether or not the similarity calculated in Step St6 is higher than or equal to the threshold is present (St9). When the person search server 50 determines that a person as a target for the comparison of whether or not the similarity calculated in Step St6 is higher than or equal to the threshold is not present (St9, NO), the process of the person search server 50 (that is, the process in response to the search request transmitted from the client terminal 90) ends. The client terminal 90 aligns and displays cut-out images of a plurality of persons corresponding to the search results of the person search server 50 (refer to FIG. 8 or 9).

When the person search server 50 determines that a person as a target for the comparison of whether or not the similarity calculated in Step St6 is higher than or equal to the threshold is present (St9, YES), the person search server 50 determines to execute the process of Step St6 on the next corresponding person (St10). Next, the person search server 50 executes the process of Step S6 on the next corresponding person. The person search server 50 repeatedly executes the processes of Steps St6 to St10 until a person as a target for the comparison of whether or not the similarity calculated in Step St6 is higher than or equal to the threshold is not present.

As described above, the person search system 100 according to the first embodiment includes: the person search server 50 that is communicatively connected to each of an n number (n: an integer of 3 or greater) of cameras; and the client terminal 90 that is communicatively connected to the person search server 50. When different captured videos transmitted from the n number of cameras are received, the person search server 50 analyzes positional information and characteristic information of persons appearing in the respective captured videos and accumulates the positional information and the characteristic information as analysis results. The client terminal 90 displays each of captured videos of a k (k: an integer of 2 or greater that satisfies k≤n) number of cameras that are selected from the n number of cameras by a user operation on the person search screen WD1. When characteristic information regarding the appearance of a search target person is selected, the client terminal 90 transmits a search request for the search target person satisfying the characteristic information in the k number of captured videos to the person search server 50. The person search server 50 uses the analysis results to extract an analysis result regarding the search target person satisfying the characteristic information in the k number of captured videos and transmits the extracted analysis result to the client terminal 90 in response to the search request. The client terminal 90 aligns and displays cut-out images of a plurality of persons identical with or similar to the search target person based on the analysis result regarding the search target person.

As a result, when an incident or the like occurs at a point (for example, an intersection) where many persons come and go, the person search system 100 can extract a captured image of a person who is visually similar to a criminal from captured videos of a plurality of cameras based on characteristic information regarding the appearance such as a decoration of the criminal. Accordingly, the person search system 100 can efficiently support a prompt grasp of visual characteristics and an escaping direction of the criminal, and can accurately improve the convenience of a police investigation.

In addition, the client terminal 90 displays the map data MP1 indicating points where the k number of cameras are installed on the person search screen WD1. As a result, when the client terminal 90 requests for the search of the search target person to the person search server 50, the user can visually and easily select a camera as a search target in a state where the user grasps a geographical position relationship between points to which a criminal is likely to escape while browsing the map data MP1.

Figure 13:
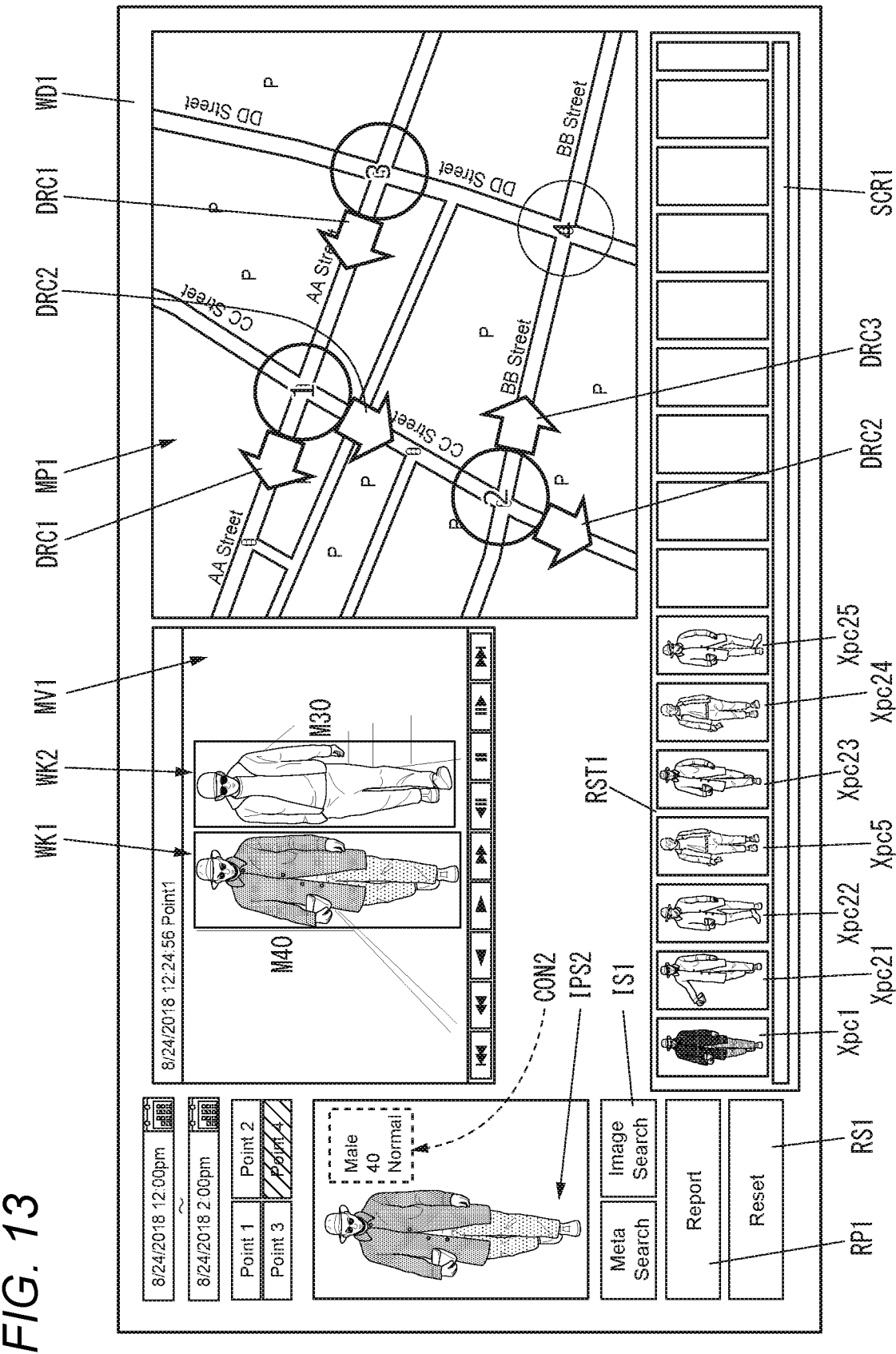
FIG. 13 is a diagram illustrating an example of the person search screen that chronologically displays person search results by the image search using the selected cut-out image of FIG. 11 or the person frame of FIG. 12.

In addition, the client terminal 90 displays movement paths of a plurality of persons identical with or similar to the search target person to overlap the map data MP1 based on the analysis result regarding the search target person (refer to FIG. 13). As a result, the user can grasp all the candidates of an escape path of the criminal of the incident or the like on the map data MP1, and thus can accurately narrow the escape path.

Figure 14:
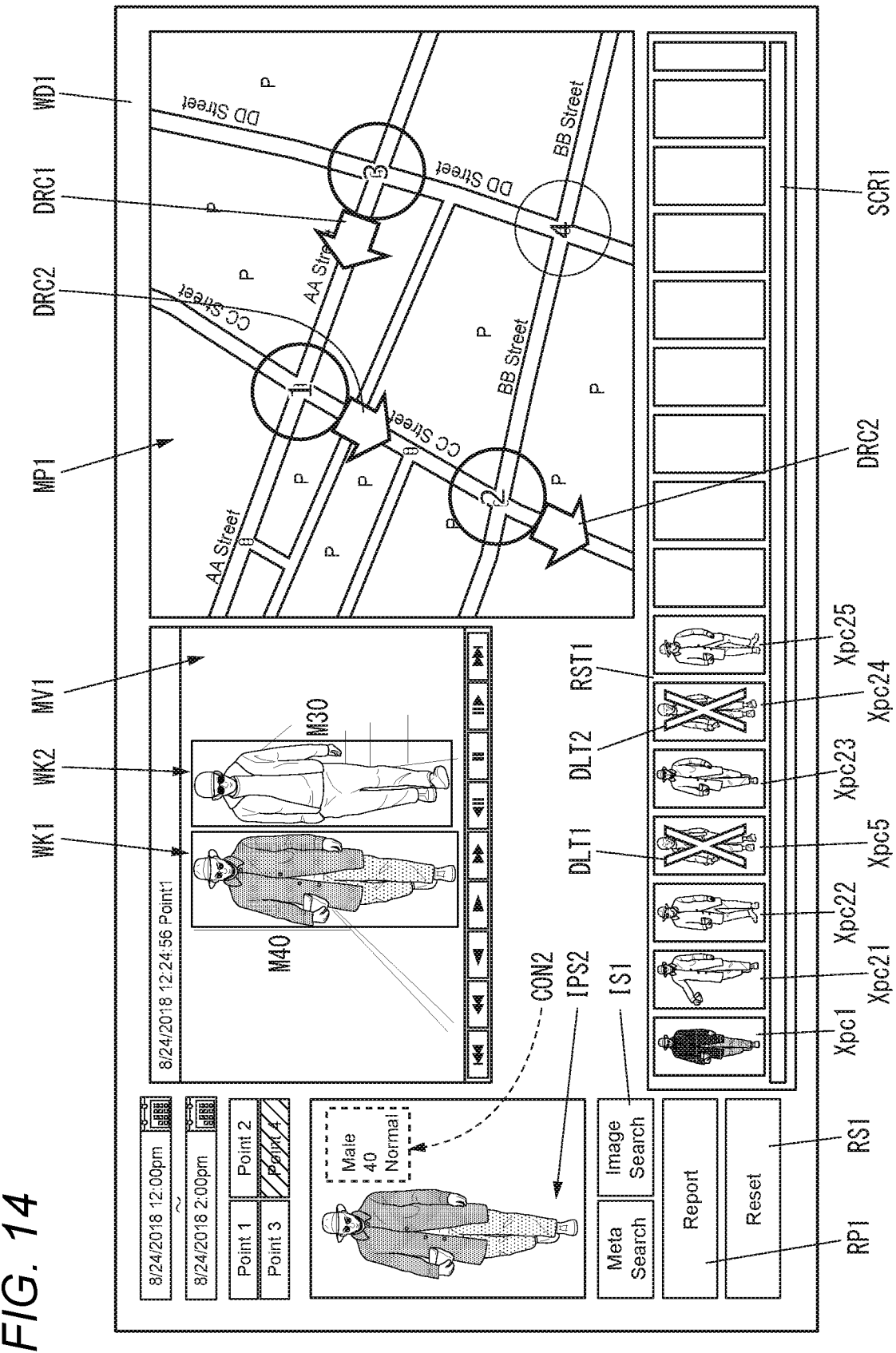
FIG. 14 is a diagram illustrating an example of deleting unnecessary person search results through a predetermined user operation.

In addition, the client terminal 90 updates and displays movement paths of the search target person displayed on the map data according to the user operation for deleting at least one cut-out image of the cut-out images of a plurality of persons (refer to FIG. 14). As a result, the user can accurately narrow whereabouts of the search target person by executing the operation of deleting unnecessary cut-out images of persons other than the search target person from the plurality of cut-out images displayed on the list display frame RST1.

In addition, the client terminal 90 receives a selection of appearance information including sex, age, height, body shape, and decoration of a person as the characteristic information regarding the appearance of the search target person. As a result, the user can finely select appearance characteristics such as the gender or the size of the search target person and appearance characteristics such as the decoration of the search target person. Accordingly, the client terminal 90 can display cut-out images of persons identical with or similar to the search target person that are carefully selected by the person search server 50, and can accurately improve the investigation efficiency of the user.

In addition, the client terminal 90 chronologically aligns and displays cut-out images of a plurality of persons identical with or similar to the search target person in order of capturing times at which the respective persons are captured. As a result, the user can promptly detect the search target person who is desired to be grasped by preferentially checking the cut-out images that are displayed in order from the oldest capturing time or the newest capturing time.

In addition, the client terminal 90 aligns and displays cut-out images of a plurality of persons identical with or similar to the search target person in order from the highest similarity to the search target person. As a result, the user can promptly detect the search target person who is desired to be grasped by preferentially checking the displayed cut-out images without scrolling, for example, the scroll bar SCR1 illustrated in FIG. 8 or 9.

(Details Leading to Configuration According to Second Embodiment)

JP-A-2017-40983 does not consider a technique of specifying a camera-captured image of a person who is visually similar to a person (that is, a criminal) causing an incident or an accident (hereinafter, referred to as "incident or the like") occurred at a point (for example, an intersection) where many persons come and go and searching for a similar captured image from a captured video of another camera based on the specified captured image as a clue.

When an incident or the like occurs, it is important to promptly grasp visual characteristics and whereabouts of a criminal in the initial investigation by police. In the related art, clues such as captured videos of cameras installed at intersections or eyewitness reports are collected, and a police officer grasps characteristics or an escaping direction of a person who is likely to correspond to a criminal based on the captured videos or the eyewitness reports. Therefore, a long time is required for the police officer to grasp the characteristics or the escaping direction of the criminal, and the initial investigation may be delayed. As a result, there is a problem in that the technique of the related art is not efficient.

In the following second embodiment, an example of a person search system and a person search method will be described in which, when an incident or the like occurs at a point where many persons come and go, a captured image of a person who is visually similar to a criminal is extracted with high accuracy, a prompt grasp of visual characteristics or the like of the criminal is efficiently supported, and the convenience of a police investigation is accurately improved.

Second Embodiment

An internal configuration of the internal configuration of the person search system according to a second embodiment is the same as the internal configuration of the person search system 100 according to the first embodiment. Accordingly, in the description of the second embodiment, the same components as those of the internal configuration of the person search system 100 according to the first embodiment are denoted with the same reference numerals, the description thereof will be simplified or omitted, and different points will be described.

FIG. 11 is a diagram illustrating a setting example for search conditions of the image search of the selected cut-out image Xpc1. The person search application detects that one cut-out image (for example, the cut-out image Xpc1) is selected from a plurality of cut-out images displayed in a list display frame RSR1 by a predetermined user operation. In this case, the person search application copies and pastes the cut-out image Xpc1 to the search target person image display frame PL1. That is, the person search application displays a person appearing in the cut-out image Xpc1 on the search target person image display frame PL1 as a search target person image IPS2 of the image search. In addition, the person search application uses an analysis result of the person search server 50 corresponding to the person of the cut-out image Xpc1 to display major characteristic information of the person (the search target person image IPS2) on the search target person image display frame PL1 as partial search conditions CON2.

FIG. 12 is a diagram illustrating a setting example of search conditions of the image search using person frames WK1 and WK2 that are displayed on the reproduction screen of the captured video MV1 of FIG. 9. As illustrated in FIG. 12, when the reproduction screen of the captured video MV1 corresponding to the cut-out image Xpc 1 selected by a predetermined user operation is displayed on the person search screen WD1, the person search application may use an analysis result of the person search server 50 corresponding to the cut-out image Xpc1 to display the person frames WK1 and WK2, sexes, and age groups of persons appearing on the reproduction screen. For example, the person search application displays "M40" (that is, male and 40's) as the sex and the age group of the person corresponding to the person frame WK1. Likewise, the person search application displays "M30" (that is, male and 30's) as the sex and the age group of the person corresponding to the person frame WK2.

The person search application detects that one person frame (for example, the person frame WK1) is selected from the person frames WK1 and WK2 displayed on the reproduction screen of the captured video MV1 by a predetermined user operation. In this case, the person search application cuts out an image in the selected person frame WK1 and copies and pastes this cut-out image to the search target person image display frame PL1. That is, the person search application displays a person appearing in the pasted cut-out image on the search target person image display frame PL1 as the search target person image IPS2 of the image search. In addition, the person search application uses an analysis result of the person search server 50 corresponding to the person of the pasted cut-out image to display major characteristic information of the person (the search target person image IPS2) on the search target person image display frame PL1 as the partial search conditions CON2.

FIG. 13 is a diagram illustrating an example of the person search screen WD1 that chronologically displays person search results in the image search using the selected cut-out image Xpc1 of FIG. 11 or the person frame WK1 of FIG. 12. When the selected cut-out image Xpc1 of FIG. 11 or the person frame Wk1 of FIG. 12 is selected by a predetermined user operation, the person search application displays the search target person image IPS2 on the search target person image display frame PL1.

Next, the person search application detects that the image search button IS1 is pressed by a user operation. In this case, the person search application (specifically, the processor 92) generates a search request for the search target person that includes image data of the search target person image IPS2, various search conditions (for example, the time and date indicating the search period) for specifying the search target person image IPS2, and identification information of a camera as a search target; and transmits the generated search request to the person search server 50 through the communication unit 93. In the second embodiment, when generating a search request, the person search application generates the search request by selecting, as search targets, cameras other than the camera corresponding to the captured video MV1 or the cut-out image Xpc1 in which the person as the source of the search target person image IPS2 appears. When the search request transmitted from the client terminal 90 is received, the person search server 50 uses the analysis results stored in the analysis information DB 56a of the accumulation unit 56 to search for persons identical with or similar to the search target person who satisfy various search conditions included in the search request by the image search. The person search server 50 transmits the search results to the client terminal 90.

When the search results are acquired through the communication unit 93, the person search application (specifically, the processor 92) aligns and displays cut-out images Xpc1, Xpc21, Xpc22, Xpc5, Xpc23, Xpc24 and Xpc25 of the persons identical with or similar to the search target person (that is, the search target person image IPS2) in the list display frame RST1. Each of the cut-out images is, for example, a thumbnail image.

In addition, the person search application displays each of moving directions DRC1, DRC2, and DRC3 which are directions in which the persons appearing in the plurality of cut-out images Xpc1, Xpc21, Xpc22, Xpc5, Xpc23, Xpc24 and Xpc25 displayed on the list display frame RST1 pass through intersections corresponding to the cameras that capture the persons to overlap the map data MP1. For example, the moving direction DRC1 is a direction moving along "AA Street" from the intersection where the third camera is disposed toward the intersection where the first camera is disposed. The moving direction DRC2 is a direction moving along "CC Street" from the intersection where the first camera is disposed toward the intersection where the second camera is disposed. The moving direction DRC3 is a direction moving along "BB Street" from the intersection where the second camera is disposed toward the intersection where the fourth camera is disposed.

Even in the above-described first embodiment, the person search application may display each of moving directions which are directions in which the persons appearing in all the cut-out images displayed on the list display frame RST1 pass through intersections corresponding to the cameras that capture the persons to overlap the map data MP1. As a result, the user can grasp all the candidates of an escape path of the criminal of the incident or the like on the map data MP1, and thus can accurately narrow the escape path.

FIG. 14 is a diagram illustrating an example of deleting unnecessary person search results with a predetermined user operation. The person search application receives a selection of unnecessary cut-out images (for example, the cut-out images Xpc5 and Xpc24) by a predetermined user operation from the cut-out images Xpc1, Xpc21, Xpc22, Xpc5, Xpc23, Xpc24 and Xpc25 displayed on the list display frame RST1 illustrated in FIG. 13. In this case, the person search application displays deletion icons DLT1 and DLT2 indicating that the selected cut-out images Xpc5 and Xpc24 are targets to be deleted to overlap the cut-out images Xpc5 and Xpc24. Instead of displaying the deletion icons DLT1 and DLT2 to overlap the cut-out images Xpc5 and Xpc24, the person search application may delete the selected cut-out images Xpc5 and Xpc24 from the list display frame RST1.

In addition, in response to the display of the deletion icons DLT1 and DLT2 overlapping the cut-out images Xpc5 and Xpc24, the person search application uses analysis results of the person search server 50 corresponding to the persons appearing in the cut-out images Xpc5 and Xpc24 to update and display the moving directions displayed on the map data MP1. Specifically, the person search application updates the moving directions such that the moving directions in which the persons appearing in the cut-out images Xpc5 and Xpc24 pass through the intersections are deleted from all the moving directions DRC1, DRC2 and DRC3 displayed on the map data MP1 before the display of the deletion icons DLT1 and DLT2, and displays only the moving directions DRC1 and DRC2 in which the persons appearing in the cut-out images Xpc1, Xpc21, Xpc22, Xpc23 and Xpc25 pass through the intersections.

Figure 15:
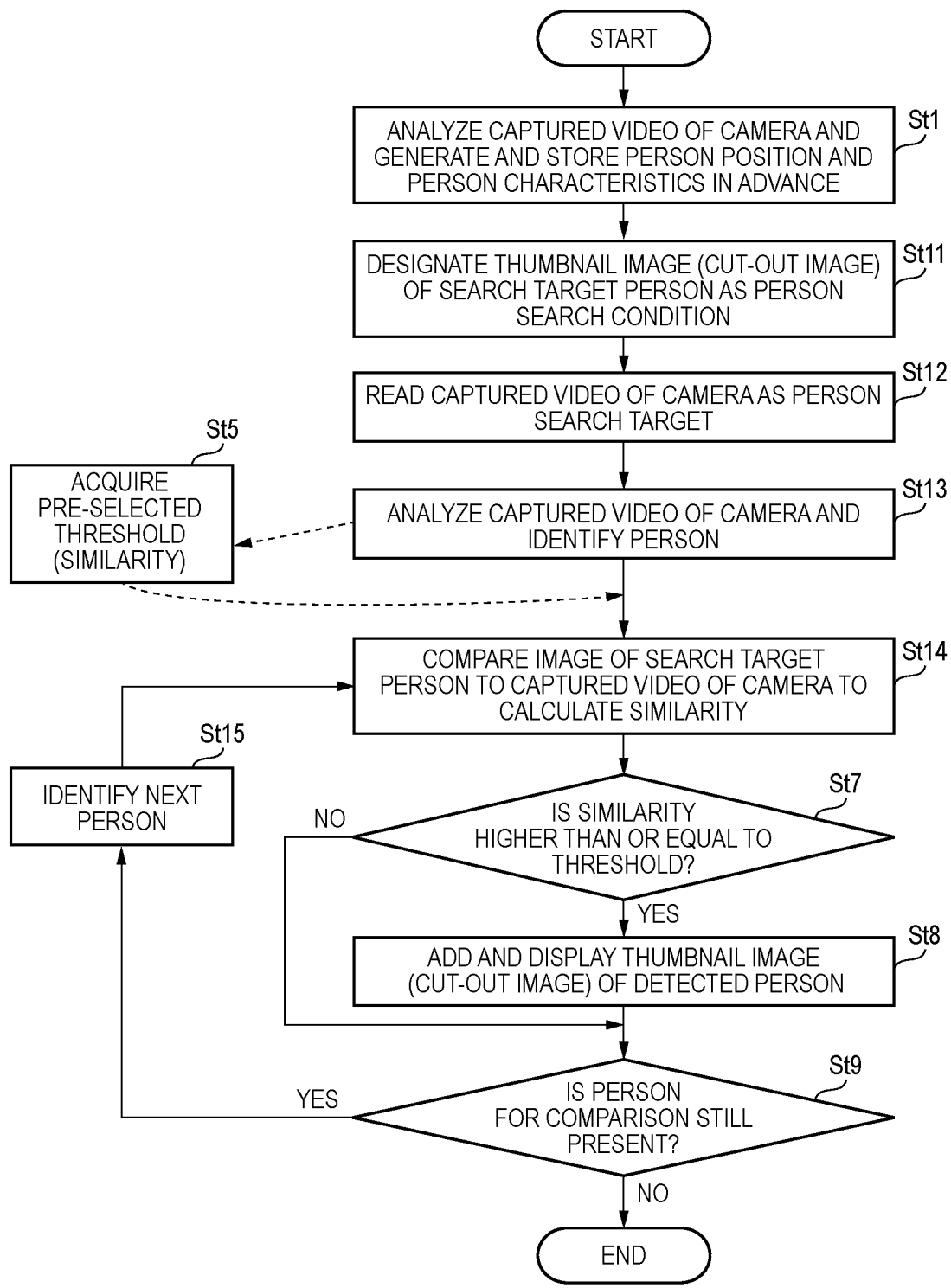
FIG. 15 is a flowchart illustrating an operational procedure example of a person search system according to a second embodiment.

Next, an operational procedure of the person search system 100 according to the second embodiment will be described with reference to FIG. 15. FIG. 15 is a flowchart illustrating the operational procedure example of the person search system 100 according to the second embodiment. Processes illustrated in FIG. 15 are executed by the client terminal 90 and the person search server 50. In the description of the processes illustrated in FIG. 15, the same processes as those illustrated in FIG. 10 are denoted with the same step numbers, the description thereof will be simplified or omitted, and different points will be described.

In FIG. 15, after Step St1, as a search condition of the search target person (for example, the search target person image IPS2), the client terminal 90 receives selection (refer to FIG. 11) by a user operation of the cut-out image Xpc1 (for example, a thumbnail image) in which the person as the source of the search target person image IPS2 appears (St11). As a search condition of the search target person (for example, the search target person image IPS2), the client terminal 90 may receive selection (refer to FIG. 11) by a user operation of the person frame WK1 in the captured video MV1 in which the person as the source of the search target person image IPS2 appears (St11). The client terminal 90 copies and pastes the cut-out image Xpc1 to the search target person image display frame PL1.

After Step St11, for example, after the client terminal 90 detects that the image search button IS1 is pressed by a user operation, the client terminal 90 generates a search request for the search target person that includes image data of the search target person image IPS2 displayed on the search target person image display frame PL1, various search conditions (for example, the time and date indicating the search period) for specifying the search target person image IPS2, and identification information of a camera as a search target; and transmits the search request to the person search server 50 through the communication unit 93. As described above, when generating a search request in the second embodiment, the person search application generates the search request by selecting, as search targets, cameras other than the camera corresponding to the captured video MV1 or the cut-out image Xpc1 in which the person as the source of the search target person image IPS2 appears.

When the search request transmitted from the client terminal 90 is received, the person search server 50 transmits a transmission request for captured video data including identification information of the camera that is a search target at a time and date indicating a search period included in the search request, and the captured video corresponding to the identification information, to the video recorder 70. The video recorder 70 acquires the captured video data corresponding to the identification information of the camera included in the transmission request and transmits the acquired captured video data to the person search server 50 based on the transmission request from the person search server 50. The person search server 50 acquires the captured video data of the camera transmitted from the video recorder 70 (St12). The person search server 50 may accumulate the captured video data transmitted from the respective cameras in the accumulation unit 56. In this case, the person search server 50 may read and acquire the captured video data directly from the accumulation unit 56 instead of receiving and acquiring the captured video data from the video recorder 70.

The person search server 50 analyzes each of the captured videos of the cameras acquired in Step St12, extracts and identifies a person appearing in the captured video, and temporarily stores the extracted analysis data in the memory 52 (St13). After Step St5, the person search server 50 compares the analysis result of the person who is analyzed in Step St13 to the characteristic information (refer to FIG. 11 or 12) of the search target person that is included in the search request transmitted from the client terminal 90 by the image search to calculate a similarity (St14). In Step St13, the person search server 50 may use the analysis results of the captured videos of the respective cameras generated in Step St1 to read and acquire an analysis result (for example, a cut-out image) of a captured video corresponding to identification information of the camera that is a search target at a time and date indicating a search period included in the search request. In this case, in Step St14, the person search server 50 may compare the read analysis result (for example, a cut-out image) of the captured video to the characteristic information (refer to FIG. 11 or 12) of the search target person that is included in the search request transmitted from the client terminal 90 by the image search to calculate a similarity (St14).

The person search server 50 determines whether or not the similarity calculated in Step St14 is higher than or equal to the threshold (refer to Step St5) (St7). When the person search server 50 determines that the calculated similarity is higher than or equal to the threshold (St7, YES), the person search server 50 transmits data of a cut-out image (for example, a thumbnail image) in which the person having a similarity higher than the threshold appears to the client terminal 90 as an example of a search result and also transmits an instruction to the client terminal 90 to display the cut-out image (St8). The client terminal 90 displays the cut-out image on the list display frame RST1 of the person search screen WD1 based on the instruction transmitted from the person search server 50 (St8). As described above, when a plurality of cut-out images to be displayed on the list display frame RST1 are received, the client terminal 90 may display these cut-out images in order from the highest similarity, in chronological order or in order of intersections.

On the other hand, when the person search server 50 determines that the calculated similarity is lower than the threshold (St7, NO), the process of Step St8 is omitted. Next or after Step St8, the person search server 50 determines whether or not a person as a target for the comparison of whether or not the similarity calculated in Step St14 is higher than or equal to the threshold is present (St9). When the person search server 50 determines that a person as a target for the comparison of whether or not the similarity calculated in Step St14 is higher than or equal to the threshold is not present (St9, NO), the process of the person search server 50 (that is, the process in response to the search request transmitted from the client terminal 90) ends. The client terminal 90 aligns and displays cut-out images of a plurality of persons corresponding to the search results of the person search server 50 (refer to FIG. 11 or 12).

When the person search server 50 determines that a person as a target for the comparison of whether or not the similarity calculated in Step St14 is higher than or equal to the threshold is present (St9, YES), the person search server 50 determines to execute the process of Step St14 on the next corresponding person (St15). Next, the person search server 50 executes the process of Step St14 on the next corresponding person. The person search server 50 repeatedly executes the processes of Steps St14, St7 to St9, and St15 until a person as a target for the comparison of whether or not the similarity calculated in Step St14 is higher than or equal to the threshold is not present.

As described above, the person search system 100 according to the second embodiment includes: the person search server 50 that is communicatively connected to each of an n number (n: an integer of 3 or greater) of cameras; and the client terminal 90 that is communicatively connected to the person search server 50. When different captured videos transmitted from the n number of cameras are received, the person search server 50 analyzes positional information and characteristic information of persons appearing in the respective captured videos and accumulates the positional information and the characteristic information as analysis results. The client terminal 90 displays each of captured videos of a k (k: an integer of 2 or greater that satisfies k≤n) number of cameras that are selected from the n number of cameras by a user operation on the person search screen WD1. When a search target person appearing in one of the k number of captured videos is selected, the client terminal 90 transmits a search request for the search target person in a (k−1) number of captured videos other than the captured video in which the search target person appears to the person search server 50. The person search server 50 uses the analysis results to extract an analysis result regarding the search target person in the (k−1) number of captured videos and transmits the extracted analysis result to the client terminal 90 in response to the search request. The client terminal 90 aligns and displays cut-out images of a plurality of persons identical with or similar to the search target person based on the analysis result regarding the search target person.

As a result, when an incident or the like occurs at a point (for example, an intersection) where many persons come and go, the person search system 100 can extract captured images of persons who are visually similar to a criminal by the image search with high accuracy. Accordingly, the person search system 100 can efficiently support a prompt grasp of visual characteristics and an escaping direction of the criminal, and can accurately improve the convenience of a police investigation.

In addition, the client terminal 90 displays the map data MP1 indicating points where the k number of cameras are installed on the person search screen WD1. As a result, when the client terminal 90 requests for the search of the search target person to the person search server 50, the user can visually and easily select a camera as a search target in a state where the user grasps a geographical position relationship between points to which a criminal is likely to escape while browsing the map data MP1.

In addition, the client terminal 90 displays movement paths of a plurality of persons identical with or similar to the search target person to overlap the map data MP1 based on the analysis result regarding the search target person. As a result, the user can grasp all the candidates of an escape path of the criminal of the incident or the like on the map data MP1, and thus can accurately narrow the escape path.

In addition, the client terminal 90 updates and displays movement paths of the search target person displayed on the map data MP1 according to the user operation for deleting at least one cut-out image of the cut-out images of a plurality of persons. As a result, the user can accurately narrow whereabouts of the search target person by executing the operation of deleting cut-out images of unnecessary persons other than the search target person from the plurality of cut-out images displayed on the list display frame RST1.

In addition, the client terminal 90 displays an outer frame (for example, the person frame WK1 or WK2) of a person appearing in the captured video MV1 of any one of the k number of cameras to overlap the captured video MV1. When the outer frame (for example, the person frame) is selected by the user operation, the client terminal 90 transmits a search request for the search target person in which a person corresponding to the selected outer frame is set as the search target person to the person search server 50. As a result, by simply selecting a suspicious person (for example, a person in the person frame WK1) on the reproduction screen of the captured video MV1 that is enlarged and displayed to be reproducible, the user can cause the client terminal 90 to execute a high-accuracy image search for the person as the search target person, and the efficiency of the police investigation can be improved.

In addition, when one of the cut-out images of a plurality of persons is selected, the client terminal 90 transmits a search request for the search target person in which a person corresponding to the selected cut-out image (for example, the cut-out image Xpc1) is set as the search target person to the person search server 50. As a result, by simply selecting a suspicious person (for example, a person in the cut-out image Xpc1) from the persons appearing in the cut-out images displayed on the list display frame RST1, the user can cause the client terminal 90 to execute a high-accuracy image search for the person as the search target person, and the efficiency of the police investigation can be improved.

In addition, the client terminal 90 chronologically aligns and displays cut-out images of a plurality of persons identical with or similar to the search target person in order of capturing times at which the respective persons are captured. As a result, the user can promptly detect the search target person who is desired to be grasped by preferentially checking the cut-out images that are displayed in order from the oldest capturing time or the newest capturing time.

In addition, the client terminal 90 aligns and displays cut-out images of a plurality of persons identical with or similar to the search target person in order from the highest similarity to the search target person. As a result, the user can promptly detect the search target person who is desired to be grasped by preferentially checking the displayed cut-out images without scrolling, for example, the scroll bar SCR1 illustrated in FIG. 11 or 12.

(Details Leading to Configuration According to Third Embodiment)

However, JP-A-2017-40983 does not consider a technique in which, when a plurality of persons commit an incident or the like occurred in a place (for example, an intersection) where many persons come and go, for example, a captured image of a person (for example, a companion of a principal offender) other than a person that looks like a principal offender is used as a clue to search for a captured image of a person similar to the companion from a captured video of another camera.

When an incident or the like occurs, it is important to promptly grasp whereabouts of a plurality of persons in a criminal group in the initial investigation by police. As a behavior pattern of the criminal group, the persons may act collectively or individually. However, in the related art, clues such as captured videos of cameras installed at an intersection or eyewitness reports are collected, and a police officer grasps escaping direction of a plurality of persons who are likely to belong to a criminal group based on the captured videos or the eyewitness reports. Therefore, for example, when persons in a criminal group act individually, a long time is required for the police officer to grasp the escaping directions of the persons in the criminal group, and the initial investigation may be delayed. As a result, there is a problem in that the technique of the related art is not efficient.

In the following third embodiment, an example of a person search system and a person search method will be described in which, when an incident or the like occurs at a point where many persons come and go, a captured image of a person who is visually similar to a person selected from a plurality of persons in a criminal group is extracted with high accuracy, a prompt grasp of visual characteristics and an escaping direction of the criminal is efficiently supported, and the convenience of a police investigation is accurately improved.

Third Embodiment

An internal configuration of the internal configuration of the person search system according to a third embodiment is the same as the internal configuration of the person search system 100 according to the first embodiment. Accordingly, in the description of the third embodiment, the same components as those of the internal configuration of the person search system 100 according to the first embodiment are denoted with the same reference numerals, the description thereof will be simplified or omitted, and different points will be described.

Figure 16:
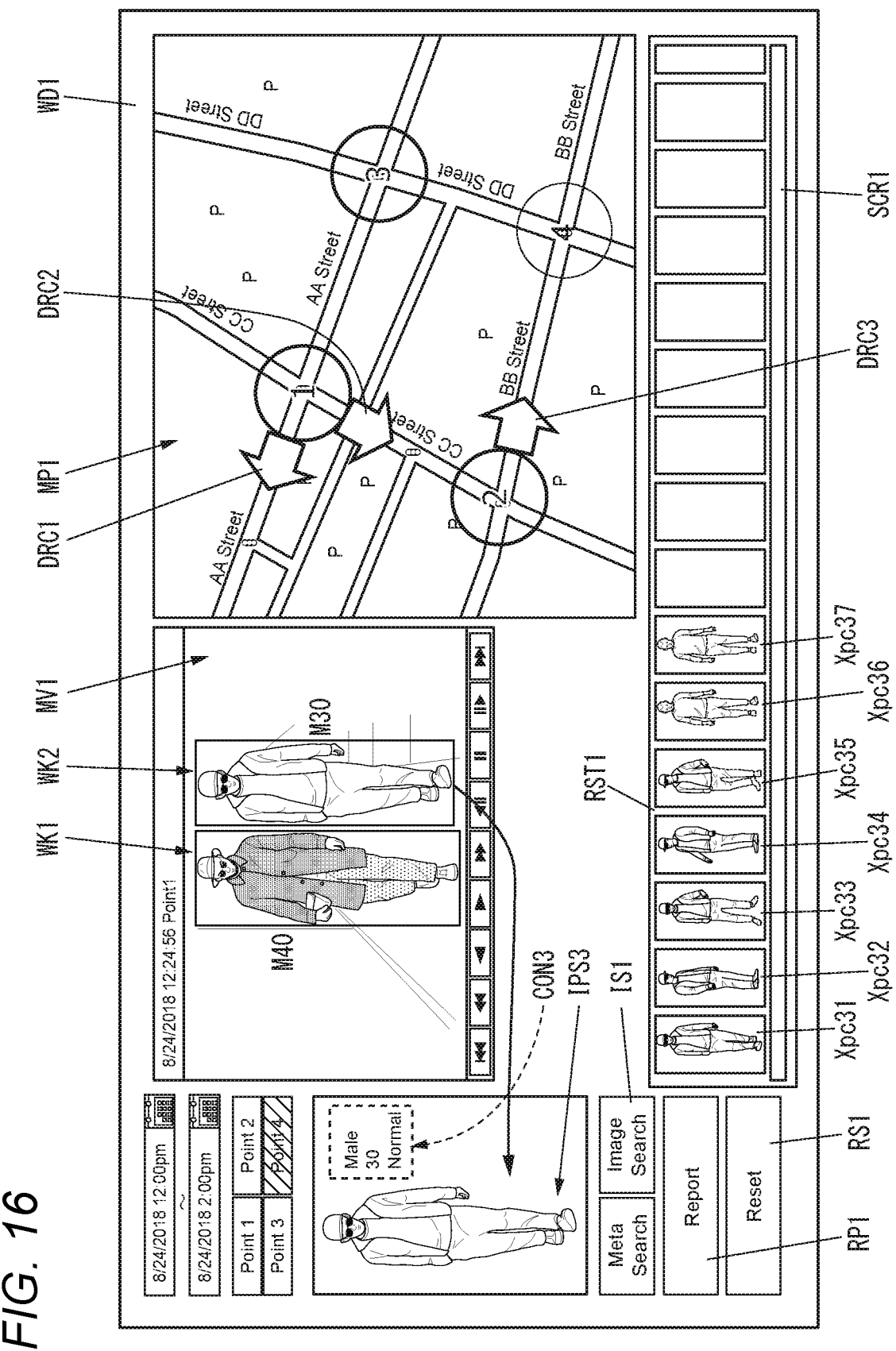
FIG. 16 is a diagram illustrating an example of the person search screen that chronologically displays person search results when a person frame of another person displayed on the reproduction screen of the captured video of FIG. 9 is used as a search condition of the image search.

FIG. 16 is a diagram illustrating an example of the person search screen WD1 that chronologically displays person search results when the person frame WK2 of another person displayed on the reproduction screen of the captured video MV1 of FIG. 9 is used as a search condition of the image search. As in the case of FIG. 12, as illustrated in FIG. 16, when the reproduction screen of the captured video MV1 corresponding to the cut-out image Xpc 1 selected by a predetermined user operation is displayed on the person search screen WD1, the person search application may use an analysis result of the person search server 50 corresponding to the cut-out image Xpc1 to display the person frames WK1 and WK2, sexes, and age groups of persons appearing on the reproduction screen. For example, the person search application displays "M40" (that is, male and 40's) as the sex and the age group of the person corresponding to the person frame WK1. Likewise, the person search application displays "M30" (that is, male and 30's) as the sex and the age group of the person corresponding to the person frame WK2.

The person search application detects that a person frame (for example, the person frame WK2) of a person other than the person as the source of the display of the reproduction screen of the captured video MV1 is selected from the person frames WK1 and WK2 displayed on the reproduction screen of the captured video MV1 by a predetermined user operation. In this case, the person search application cuts out an image in the selected person frame WK2 and copies and pastes this cut-out image to the search target person image display frame PL1. That is, the person search application displays a person appearing in the pasted cut-out image on the search target person image display frame PL1 as a search target person image IPS3 of the image search. In addition, the person search application uses an analysis result of the person search server 50 corresponding to the person of the pasted cut-out image to display manor characteristic information of the person (the search target person image IPS3) on the search target person image display frame PL1 as partial search conditions CON3.

The person search application detects that the image search button IS1 is pressed by a user operation. In this case, the person search application (specifically, the processor 92) generates a search request for the search target person that includes image data of the search target person image IPS3, various search conditions (for example, the time and date indicating the search period) for specifying the search target person image IPS3, and identification information of a camera as a search target; and transmits the generated search request to the person search server 50 through the communication unit 93. In a third embodiment, when generating a search request, the person search application generates the search request by selecting, as search targets, cameras other than the camera corresponding to the captured video MV1 in which the person as the source of the search target person image IPS3 appears. When the search request transmitted from the client terminal 90 is received, the person search server 50 uses the analysis results stored in the analysis information DB 56a of the accumulation unit 56 to search for persons identical with or similar to the search target person who satisfy various search conditions included in the search request by the image search. The person search server 50 transmits the search results to the client terminal 90.

When the search results are acquired through the communication unit 93, the person search application (specifically, the processor 92) aligns and displays cut-out images Xpc31, Xpc32, Xpc33, Xpc34, Xpc35, Xpc36 and Xpc37 of the persons identical with or similar to the search target person (that is, the search target person image IPS3) in the list display frame RST1. Each of the cut-out images is, for example, a thumbnail image.

In addition, the person search application displays each of the moving directions DRC1, DRC2 and DRC3 which are directions in which the persons appearing in the plurality of cut-out images Xpc31, Xpc32, Xpc33, Xpc34, Xpc35, Xpc36 and Xpc37 displayed on the list display frame RST1 pass through intersections corresponding to the cameras that capture the persons to overlap the map data MP1.

Figure 17:
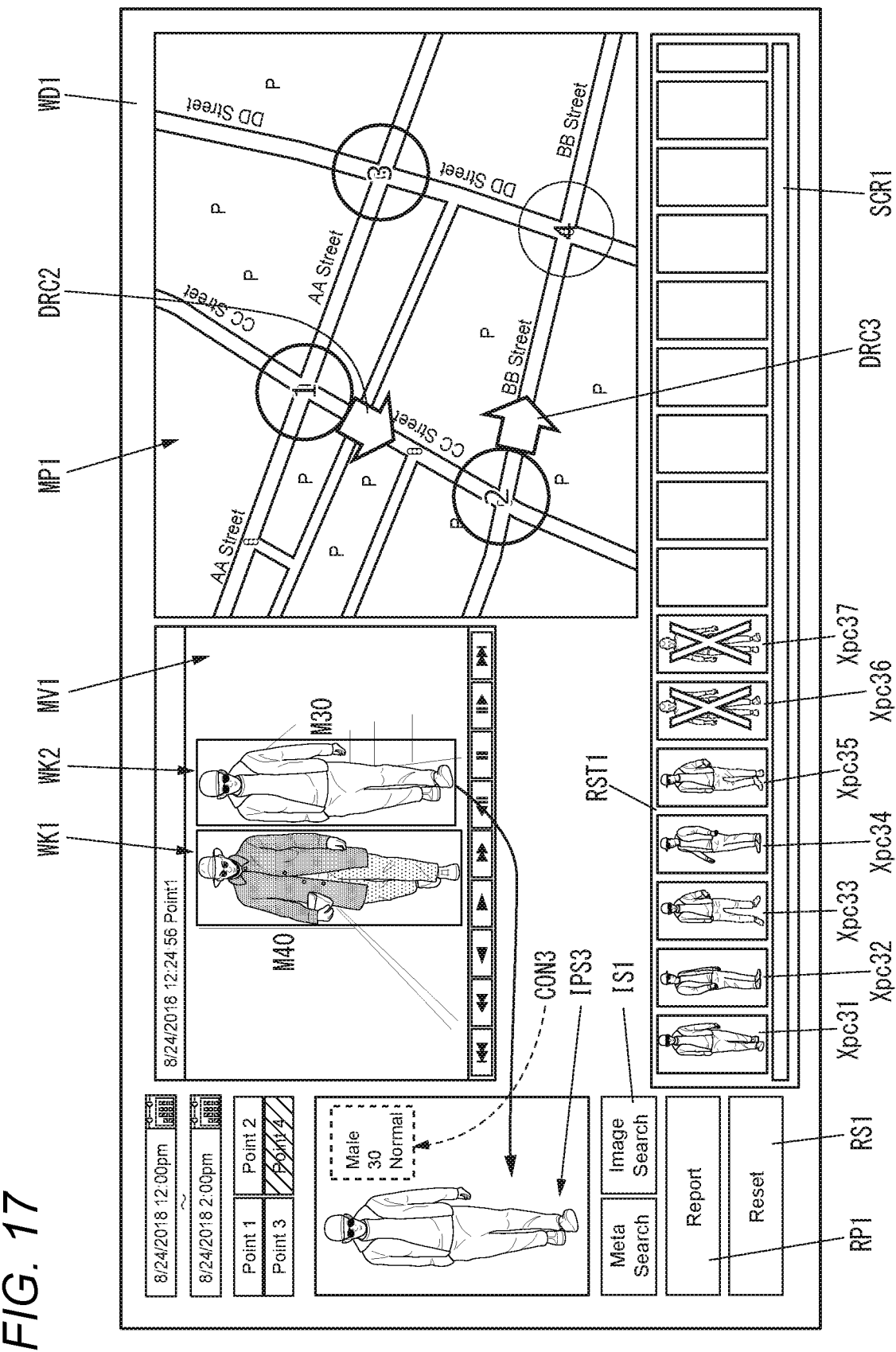
FIG. 17 is a diagram illustrating an example of deleting unnecessary person search results through a user operation.

FIG. 17 is a diagram illustrating an example of deleting unnecessary person search results through a user operation. The person search application receives a selection of unnecessary cut-out images (for example, the cut-out images Xpc36 and Xpc37) by a predetermined user operation from the cut-out images Xpc31, Xpc32, Xpc33, Xpc34, Xpc35, Xpc36 and Xpc37 displayed on the list display frame RST1 illustrated in FIG. 17. In this case, the person search application displays deletion icons DLT1 and DLT2 indicating that the selected cut-out images Xpc36 and Xpc37 are targets to be deleted to overlap the cut-out images Xpc36 and Xpc37. Instead of displaying the deletion icons DLT1 and DLT2 to overlap the cut-out images Xpc36 and Xpc37, the person search application may delete the selected cut-out images Xpc36 and Xpc37 from the list display frame RST1.

In addition, in response to the display of the deletion icons DLT1 and DLT2 overlapping the cut-out images Xpc36 and Xpc37, the person search application uses analysis results of the person search server 50 corresponding to the persons appearing in the cut-out images Xpc36 and Xpc37 to update and display the moving directions displayed on the map data MP1. Specifically, the person search application updates the moving directions such that the moving directions in which the persons appearing in the cut-out images Xpc36 and Xpc37 pass through the intersections are deleted from all the moving directions DRC1, DRC2,and DRC3 displayed on the map data MP1 before the display of the deletion icons DLT1 and DLT2, and displays only the moving directions DRC2 and DRC3 in which the persons appearing in the cut-out images Xpc31, Xpc32, Xpc33, Xpc34 and Xpc35 pass through the intersections. As a result, the user can verify from FIGS. 14 and 17 that the two persons (for example, the criminal group) of person frames WK1 and WK2 appearing in the captured video MV1 that is captured by the first camera join together at the intersection where the first camera is installed, and thus the efficiency of the police investigation can be improved.

Figure 18:
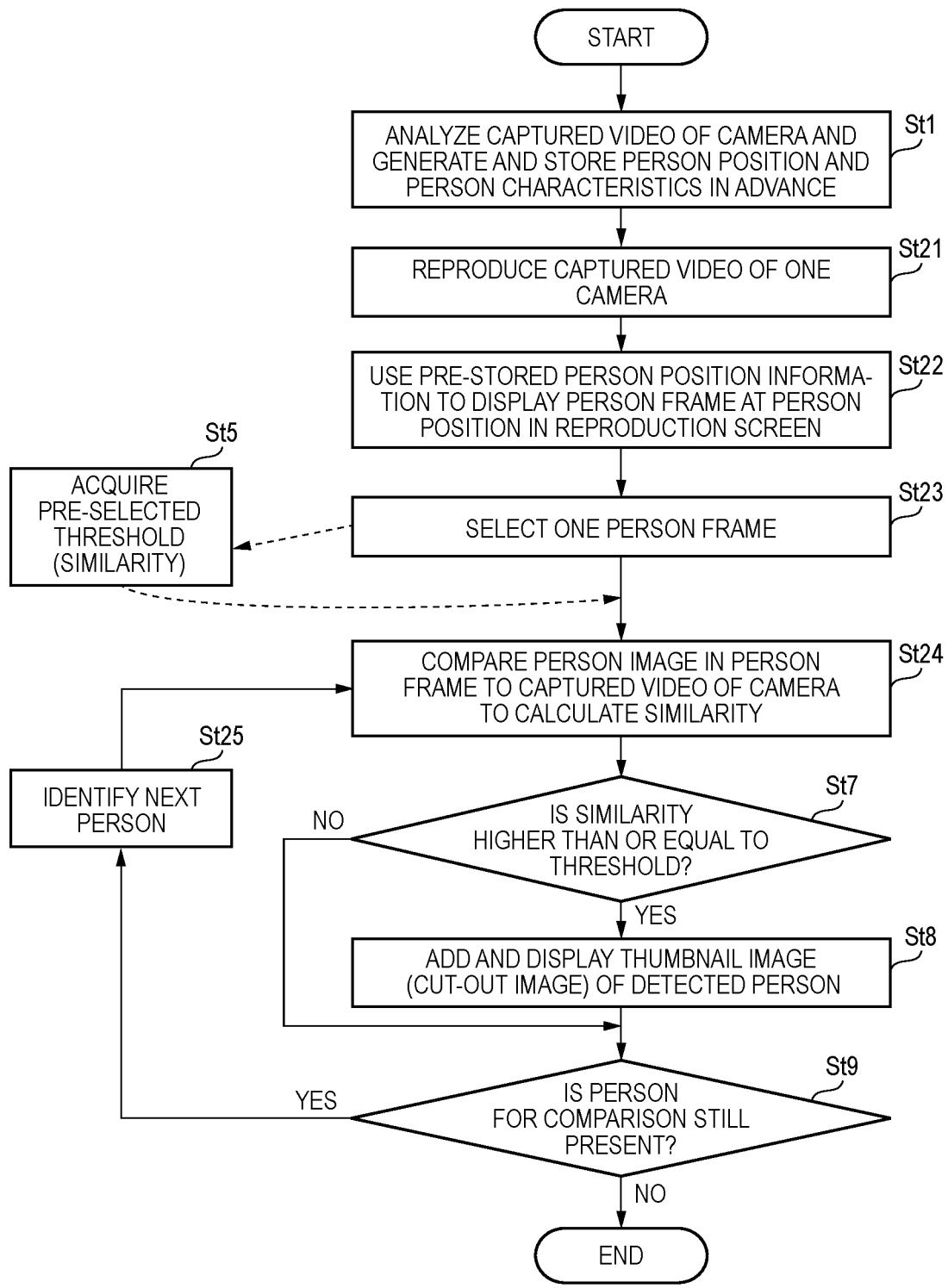
FIG. 18 is a flowchart illustrating an operational procedure example of a person search system according to a third embodiment.

Next, an operational procedure of the person search system 100 according to the third embodiment will be described with reference to FIG. 18. FIG. 18 is a flowchart illustrating the operational procedure example of the person search system 100 according to Embodiment 3. Processes illustrated in FIG. 18 are executed by the client terminal 90 and the person search server 50. In the description of the processes illustrated in FIG. 18, the same processes as those illustrated in FIG. 10 are denoted with the same step numbers, the description thereof will be simplified or omitted, and different points will be described. As a precondition for the processes illustrated in FIG. 18, as described above with reference to FIG. 10 or 15, the client terminal 90 acquires analysis results (search results) of the person search server 50 corresponding to the cut-out images displayed on the list display frame RST1, respectively.

In FIG. 18, when the client terminal 90 detects that one cut-out image is selected from the plurality of cut-out images displayed on the list display frame RST1 after Step St1 by a user operation, the client terminal 90 repeatedly plays the captured video (for example, the captured video MV1) in which the person in the selected cut-out image (for example, the cut-out image Xpc31) appears on the person search screen WD1 (St21). The client terminal 90 acquires the analysis results generated by the person search server 50 in Step St1, and uses the analysis results to display the person frames WK1 and WK2 at respective positions of the persons in the reproduction screen of the captured video MV1 (St22).

The client terminal 90 detects that any one (for example, the person frame WK2 of the person other than the person of the person frame WK1 as the source of the display of the reproduction screen of the captured video MV1) of the person frames WK1 and WK2 displayed in Step St22 is selected by a user operation (St23). In this case, the client terminal 90 copies and pastes the cut-out image of the person of the selected person frame WK2 to the search target person image display frame PL1.

After Step St23, for example, after the client terminal 90 detects that the image search button IS1 is pressed by a user operation, the client terminal 90 generates a search request for the search target person that includes image data of the search target person image IPS3 displayed on the search target person image display frame PL1, various search conditions (for example, the time and date indicating the search period) for specifying the search target person image IPS3, and identification information of a camera as a search target; and transmits the search request to the person search server 50 through the communication unit 93. As described above, when generating a search request in the third embodiment, the person search application generates the search request by selecting, as search targets, cameras other than the camera corresponding to the captured video MV1 in which the person as the source of the search target person image IPS3 appears.

When the search request transmitted from the client terminal 90 is received, the person search server 50 transmits a transmission request for captured video data including identification information of the camera that is a search target at a time and date indicating a search period included in the search request, and the captured video corresponding to the identification information, to the video recorder 70. The video recorder 70 acquires the captured video data corresponding to the identification information of the camera included in the transmission request and transmits the acquired captured video data to the person search server 50 based on the transmission request from the person search server 50. The person search server 50 acquires the captured video data of the camera transmitted from the video recorder 70. The person search server 50 may accumulate the captured video data transmitted from the respective cameras in the accumulation unit 56. In this case, the person search server 50 may read and acquire the captured video data directly from the accumulation unit 56 instead of receiving and acquiring the captured video data from the video recorder 70.

The person search server 50 analyzes each of the acquired captured videos of the cameras, extracts and identifies a person appearing in the captured video, and temporarily stores the extracted analysis data in the memory 52. The person search server 50 compares the analysis result of the person of the person frame WK2 that is selected in Step St23 to the characteristic information (refer to FIG. 11 or 12) of the search target person that is included in the search request transmitted from the client terminal 90 by the image search to calculate a similarity (St24). The person search server 50 may use the analysis results of the captured videos of the respective cameras generated in Step St1 to read and acquire an analysis result (for example, a cut-out image) of a captured video corresponding to identification information of the camera that is a search target at a time and date indicating a search period included in the search request. In this case, in Step St24, the person search server 50 may compare the read analysis result (for example, a cut-out image) of the captured video to the characteristic information (refer to FIG. 11 or 12) of the search target person that is included in the search request transmitted from the client terminal 90 by the image search to calculate a similarity (St24).

The person search server 50 determines whether or not the similarity calculated in Step St24 is higher than or equal to the threshold (refer to Step St5) (St7). When the person search server 50 determines that the calculated similarity is higher than or equal to the threshold (St7, YES), the person search server 50 transmits data of a cut-out image (for example, a thumbnail image) in which the person having a similarity higher than the threshold appears to the client terminal 90 as an example of a search result and also transmits an instruction to the client terminal 90 to display the cut-out image (St8). The client terminal 90 displays the cut-out image on the list display frame RST1 of the person search screen WD1 based on the instruction transmitted from the person search server 50 (St8). As described above, when a plurality of cut-out images to be displayed on the list display frame RST1 are received, the client terminal 90 may display these cut-out images in order from the highest similarity, in chronological order or in order of intersections.

On the other hand, when the person search server 50 determines that the calculated similarity is lower than the threshold (St7, NO), the process of Step St8 is omitted. Next or after Step St8, the person search server 50 determines whether or not a person as a target for the comparison of whether or not the similarity calculated in Step St24 is higher than or equal to the threshold is present (St9). When the person search server 50 determines that a person as a target for the comparison of whether or not the similarity calculated in Step St24 is higher than or equal to the threshold is not present (St9, NO), the process of the person search server 50 (that is, the process in response to the search request transmitted from the client terminal 90) ends. The client terminal 90 aligns and displays cut-out images of a plurality of persons corresponding to the search results of the person search server 50 (refer to FIG. 16 or 17).

When the person search server 50 determines that a person as a target for the comparison of whether or not the similarity calculated in Step St24 is higher than or equal to the threshold is present (St9, YES), the person search server 50 determines to execute the process of Step St24 on the next corresponding person (St25). Next, the person search server 50 executes the process of Step St24 on the next corresponding person. The person search server 50 repeatedly executes the processes of Steps St24, St7 to St9, and St25 until a person as a target for the comparison of whether or not the similarity calculated in Step St24 is higher than or equal to the threshold is not present.

As described above, the person search system 100 according to the third embodiment includes: the person search server 50 that is communicatively connected to each of an n number (n: an integer of 3 or greater) of cameras; and the client terminal 90 that is communicatively connected to the person search server 50. When different captured videos transmitted from the n number of cameras are received, the person search server 50 analyzes positional information and characteristic information of persons appearing in the respective captured videos and accumulates the positional information and the characteristic information as analysis results. The client terminal 90 displays each of captured videos of a k (k: an integer of 2 or greater that satisfies k≤n) number of cameras that are selected from the n number of cameras by a user operation on the person search screen WD1. When a companion (for example, the person of the person frame WK2) who acts together with the search target person appearing in any one of the k number of captured videos is selected, the client terminal 90 transmits a search request for the companion in a (k−1) number of captured videos other than the captured video in which the companion appears to the person search server 50. The person search server 50 uses the analysis results to extract an analysis result regarding the companion in the (k−1) number of captured videos and transmits the extracted analysis result to the client terminal 90 in response to the search request. The client terminal 90 aligns and displays cut-out images of a plurality of persons identical with or similar to the companion based on the analysis result regarding the companion.

As a result, when an incident or the like occurs at a point (for example, an intersection) where many persons come and go, the person search system 100 can extract a captured image of a person (for example, the accomplice of the person frame WK2) who is visually similar to a person selected from a plurality of persons (for example, the persons corresponding to the person frames WK1 and WK2, respectively) in a criminal group by the image search with high accuracy. Accordingly, the person search system 100 can efficiently support a prompt grasp of visual characteristics and an escaping direction of the criminal, and can accurately improve the convenience of a police investigation.

In addition, the client terminal 90 displays the map data MP1 indicating points where the k number of cameras are installed on the person search screen WD1. As a result, when the client terminal 90 requests for the search of the search target person to the person search server 50, the user can visually and easily select a camera as a search target in a state where the user grasps a geographical position relationship between points to which a criminal is likely to escape while browsing the map data MP1.

In addition, the client terminal 90 displays movement paths of a plurality of persons identical with or similar to the companion to overlap the map data MP1 based on the analysis result regarding the companion. As a result, the user can grasp all the candidates of an escape path of the companion (for example, the accomplice) in the criminal group of the incident or the like on the map data MP1, and thus can accurately narrow the escape path.

In addition, the client terminal 90 updates and displays movement paths of the companion displayed on the map data MP1 according to the user operation for deleting at least one cut-out image of the cut-out images of a plurality of persons. As a result, the user can accurately narrow whereabouts of the companion (for example, the accomplice) by executing the operation of deleting unnecessary cut-out images of persons other than the companion (for example, the accomplice) from the plurality of cut-out images displayed on the list display frame RST1.

In addition, the client terminal 90 displays an outer frame (for example, the person frame WK1 or WK2) of a person appearing in a captured video of any one of the k number of cameras to overlap the captured video. When the outer frame (for example, the person frame WK2) is selected by the user operation, the client terminal 90 transmits a search request for a person corresponding to the selected outer frame as the companion to the person search server 50. As a result, by simply selecting a suspicious person (for example, the person of the person frame WK2 accompanied by the person of the person frame WK1 who is determined to be the principal offender by the user) from the persons appearing in the reproduction screen of the captured video MV1 that is being reproduced, the user can cause the client terminal 90 to execute a high-accuracy image search for the person as the companion (for example, the accomplice), and the efficiency of the police investigation can be improved.

In addition, the client terminal 90 chronologically aligns and displays cut-out images of a plurality of persons identical with or similar to the companion in order of capturing times at which the respective persons are captured. As a result, the user can promptly detect the companion (for example, the accomplice) who is desired to be grasped by preferentially checking the cut-out images that are displayed in order from the oldest capturing time or the newest capturing time.

In addition, the client terminal 90 aligns and displays cut-out images of a plurality of persons identical with or similar to the companion in order from the highest similarity to the companion. As a result, the user can promptly detect the companion (for example, the accomplice) who is desired to be grasped by preferentially checking the displayed cut-out images without scrolling, for example, the scroll bar SCR1 illustrated in FIG. 11 or 12.

Hereinabove, the embodiments have been described with reference to the drawings, but it is needless to say that the present disclosure is not limited to these examples. It is obvious that those skilled in the art can conceive various change examples, modification examples, substitution examples, addition examples, deletion examples, and equivalent examples within the scope of the claims, and it is understood that these examples are also included in the technical scope of the present disclosure. Furthermore, the components in the above various embodiments may be combined in any way within a range not departing from the gist of the present invention.

In the above descriptions of Embodiments 1, 2, and 3, the installation sites of the cameras 10, 10*a*, and . . . are outdoors (for example, intersections) but are not limited thereto. For example, the cameras may be installed in an indoor facility such as a shopping mall. In this case, the map data MP1 is not the road map, and a map of the corresponding facility (for example, a map of a shopping mall) may be displayed in the person search screen WD1.

In addition, in the above descriptions of Embodiments 1, 2, and 3, a criminal who commits an incident or the like or an accomplice who acts together with the criminal is used as an example of the search target person in the police investigation. However, the search target person is not limited to these examples. For example, a child who is missing outdoors or indoors may be set as the search target person. In this case, with the person search system 100, a police officer or a guard on patrol as a user can search for a missing child as the search target person.

The present application is based upon Japanese Patent Application (Patent Application No. 2018-176489) filed on Sep. 30, 2018, the contents of which are incorporated herein by reference.

What is claimed is:

1. A person search system comprising:
a server connected to communicate with each of an n number of cameras, where n is an integer of at least 3; and
a client terminal connected to communicate with the server, wherein
the server receives captured videos transmitted from the n number of cameras, analyzes position information and characteristic information on a person appearing in each of the captured videos, and accumulates the position information and the characteristic information as analysis results,
the client terminal displays, on a reproduction area of a screen, each of the captured videos of a k number of cameras, where k is an integer of at least 3 that satisfies k≤n, and the k number of cameras are selected from the n number of cameras by a user operation, the client terminal simultaneously displaying, with the captured videos of the k number of cameras, map data on the screen, the map data indicating points where the k number of cameras are located,
according to at least one selection from the characteristic information regarding an appearance of a search target person, the client terminal transmits, to the server, a search request for the search target person satisfying selected characteristic information in the k number of captured videos,
the server uses the analysis results to extract an analysis result regarding the search target person satisfying the selected characteristic information in the k number of captured videos and transmits the analysis result to the client terminal in response to the search request,
the client terminal aligns and displays, on the screen, cut-out images of one or more persons identical with or similar to the search target person based on the analysis result regarding the search target person, and
the client terminal displays, on the reproduction area of the screen and in response to a selection of one cut-out-image from the cut-out images, a first captured video of the captured videos of the k number of cameras, the first captured video corresponding to the one cut-out-image, the client terminal simultaneously displaying, with the first captured video, at least two second captured videos of the captured videos of the k number of cameras, each of the at least two second captured videos being displayed on the map data in association with a corresponding one of the points where the k number of cameras are located, and
the at least two second captured videos, which are simultaneously displayed with the first captured video, are captured at a same time.

2. The person search system according to claim 1, wherein the client terminal displays, on the screen, movement paths of the one or more persons identical with or similar to the search target person to overlap the map data based on the analysis result regarding the search target person.

3. The person search system according to claim 2, wherein the client terminal updates and displays the movement paths of the one or more persons identical with or similar to the search target person displayed on the map data according to a second user operation for deleting at least one cut-out image of the cut-out images of the one or more persons.

4. The person search system according to claim 1, wherein the at least one selection from the characteristic information regarding the appearance of the search target person includes at least one of sex, age, height, body shape, or decoration of a person.

5. The person search system according to claim 1, wherein the client terminal chronologically aligns and displays the cut-out images of the one or more persons identical with or similar to the search target person in order of capturing times at which the one or more persons are captured.

6. The person search system according to claim 1, wherein the client terminal aligns and displays the cut-out images of the one or more persons identical with or similar to the search target person in order from a highest similarity to the search target person.

7. The person search system according to claim 1, wherein the client terminal further displays, on the screen, an image of the search target person, which is set according to the at least one selection of the characteristic information, so that the search target person is visually verifiable.

8. The person search system according to claim 7, wherein the image of the search target is displayed on the screen together with the captured videos of the k number of cameras.

9. The person search system according to claim 8, wherein the client terminal further displays, on the screen and in association with the image of the search target person, the selected characteristic information.

10. The person search system according to claim 8, wherein
the characteristic information from which the at least one selection is made includes physical characteristics and decoration characteristics, and
the client terminal further displays, on the screen and in association with the image of the search target person, only selected physical characteristics from among the selected characteristic information and not selected decoration characteristics.

11. The person search system according to claim 1, wherein the server stores the analysis results, which are accumulated from the position information and the characteristic information on the person appearing in each of the captured videos, in a database.

12. The person search system according to claim 11, wherein the analysis results are stored in the database before the search request for the search target person is received from the client terminal.

13. The person search system according to claim 1, wherein the client terminal aligns and displays the cut-out images of the one or more persons identical with or similar to the search target person according to intersections where the k number of cameras are installed.

14. A person search method implemented by a server, the server connected to communicate with each of an n number of cameras, where n is an integer of at least 3, and a client terminal connected to communicate with the server, the person search method comprising:
receiving captured videos transmitted from the n number of cameras, analyzing position information and characteristic information on a person appearing in each of the captured videos, and accumulating the position information and the characteristic information as analysis results;
displaying, on a reproduction area of a screen, each of captured videos of a k number of cameras, where k is an integer of at least 3 that satisfies k≤n, and the k number of cameras are selected from the n number of cameras by a user operation, and simultaneously displaying, with the captured videos of the k number of cameras, map data on the screen, the map data indicating points where the k number of cameras are located;
according to at least one selection from the characteristic information regarding an appearance of a search target person, transmitting, to the server, a search request for the search target person satisfying selected characteristic information in the k number of captured videos;
using the analysis results to extract an analysis result regarding the search target person satisfying the selected characteristic information in the k number of captured videos and transmitting the extracted analysis result to the client terminal in response to the search request;
aligning and displaying, on the screen, cut-out images of one or more persons identical with or similar to the search target person based on the extracted analysis result regarding the search target person; and
displaying, on the reproduction area of the screen and in response to a selection of one cut-out-image from the cut-out images, a first captured video of the captured videos of the k number of cameras, the first captured video corresponding to the one cut-out-image, and simultaneously displaying, with the first captured video, at least two second captured videos of the captured videos of the k number of cameras, each of the at least two second captured videos being displayed on the map data in association with a corresponding one of the points where the k number of cameras are located,
wherein the at least two second captured videos, which are simultaneously displayed with the first captured video, are captured at a same time.

* * * * *